United States Patent
Aaltonen et al.

(10) Patent No.: US 8,359,349 B2
(45) Date of Patent: Jan. 22, 2013

(54) SYSTEM AND ASSOCIATED TERMINAL, METHOD AND COMPUTER PROGRAM PRODUCT FOR UPLOADING CONTENT

(75) Inventors: Janne La. Aaltonen, Turku (FI); Ari Hännikäinen, Turku (FI); Ahti Muhonen, Hirvihaara (FI); Antti-Pentti Vainio, Espoo (FI)

(73) Assignee: Nokia Corporation, Espoo (FI)

( * ) Notice: Subject to any disclaimer, the term of this patent is extended or adjusted under 35 U.S.C. 154(b) by 1244 days.

(21) Appl. No.: 10/803,684

(22) Filed: Mar. 18, 2004

(65) Prior Publication Data

US 2005/0209927 A1 Sep. 22, 2005

(51) Int. Cl.
- *G06F 15/16* (2006.01)
- *G06F 15/173* (2006.01)
- *H03C 7/02* (2006.01)
- *H04B 7/02* (2006.01)
- *H04M 3/00* (2006.01)
- *H04W 24/00* (2009.01)
- *H04W 4/00* (2009.01)

(52) U.S. Cl. ........ 709/203; 455/101; 455/420; 455/424; 455/466; 709/217; 709/219; 709/223; 709/224; 709/227; 709/231; 709/237

(58) Field of Classification Search .............. None
See application file for complete search history.

(56) References Cited

U.S. PATENT DOCUMENTS

| | | | |
|---|---|---|---|
| 5,493,692 A | | 2/1996 | Theimer et al. |
| 6,035,104 A | * | 3/2000 | Zahariev .................. 709/203 |
| 6,058,395 A | * | 5/2000 | Buzaglo et al. .................. 1/1 |
| 6,289,012 B1 | * | 9/2001 | Harrington et al. ........... 370/389 |
| 6,452,930 B1 | | 9/2002 | Seidman |
| 6,738,635 B1 | * | 5/2004 | Lewis et al. .................. 455/466 |
| 6,785,786 B1 | * | 8/2004 | Gold et al. .................... 711/162 |
| 6,957,374 B1 | * | 10/2005 | Redeske ...................... 714/748 |
| 7,095,519 B1 | * | 8/2006 | Stewart et al. ............... 358/1.15 |
| 7,257,386 B1 | * | 8/2007 | McDonnell et al. .......... 455/403 |
| 7,284,261 B1 | * | 10/2007 | Connelly ..................... 725/140 |

(Continued)

FOREIGN PATENT DOCUMENTS

| | | |
|---|---|---|
| EP | 1 130 459 A2 | 9/2001 |
| EP | 1 225 717 A2 | 7/2002 |

(Continued)

OTHER PUBLICATIONS

R. Fielding et al., Hypertext Transfer Protocol—HTTP/1.1, Jun. 1999, Heading 9.3-9.6.*

(Continued)

*Primary Examiner* — Moustafa M Meky
*Assistant Examiner* — Ho Shiu
(74) *Attorney, Agent, or Firm* — Ditthavong Mori & Steiner, P.C.

(57) ABSTRACT

A system for uploading content includes a sender capable of sending an upload request, where the upload request comprises a request to upload content from the sender to a recipient. The system also includes a network entity, such as the recipient, capable of operating an upload agent. The upload agent, in turn, is capable of receiving the upload request, and thereafter determining an upload schedule relating to the time and/or manner of uploading the content. The sender can then be capable of uploading the content to the recipient in accordance with the upload schedule. The network entity can be further capable of recovering an upload session that has encountered an interruption.

102 Claims, 8 Drawing Sheets

U.S. PATENT DOCUMENTS

| | | | | |
|---|---|---|---|---|
| 7,289,817 | B2 * | 10/2007 | Chun | 455/466 |
| 7,721,104 | B2 * | 5/2010 | Salo et al. | 713/176 |
| 2002/0021809 | A1 | 2/2002 | Salo et al. | |
| 2002/0023264 | A1 | 2/2002 | Aaltonen et al. | |
| 2002/0026645 | A1 * | 2/2002 | Son et al. | 725/117 |
| 2002/0028430 | A1 * | 3/2002 | Driscoll et al. | 434/322 |
| 2002/0032027 | A1 | 3/2002 | Kirani et al. | |
| 2002/0049853 | A1 * | 4/2002 | Chu et al. | 709/237 |
| 2002/0069406 | A1 | 6/2002 | Aaltonen et al. | |
| 2002/0078228 | A1 | 6/2002 | Kuisma et al. | |
| 2002/0087549 | A1 | 7/2002 | Mostafa | |
| 2002/0087997 | A1 | 7/2002 | Dahlstrom | |
| 2002/0142780 | A1 * | 10/2002 | Airy et al. | 455/452 |
| 2002/0143971 | A1 * | 10/2002 | Govindarajan et al. | 709/230 |
| 2002/0156921 | A1 * | 10/2002 | Dutta et al. | 709/246 |
| 2002/0160805 | A1 | 10/2002 | Laitinen et al. | |
| 2002/0184457 | A1 | 12/2002 | Yuasa et al. | |
| 2002/0194205 | A1 * | 12/2002 | Brown et al. | 707/200 |
| 2003/0033554 | A1 * | 2/2003 | Bomfim et al. | 714/4 |
| 2003/0045357 | A1 | 3/2003 | Bishop | |
| 2003/0068046 | A1 * | 4/2003 | Lindqvist et al. | 380/277 |
| 2003/0084177 | A1 | 5/2003 | Mulligan | |
| 2003/0088778 | A1 | 5/2003 | Lindqvist et al. | |
| 2003/0095540 | A1 | 5/2003 | Mulligan et al. | |
| 2003/0104801 | A1 | 6/2003 | Klulakiotis et al. | |
| 2003/0120802 | A1 * | 6/2003 | Kohno | 709/237 |
| 2003/0134653 | A1 | 7/2003 | Sarkkinen et al. | |
| 2003/0167317 | A1 * | 9/2003 | Deen et al. | 709/219 |
| 2003/0174645 | A1 | 9/2003 | Paratainen et al. | |
| 2003/0182420 | A1 * | 9/2003 | Jones et al. | 709/224 |
| 2004/0003266 | A1 * | 1/2004 | Moshir et al. | 713/191 |
| 2004/0005873 | A1 * | 1/2004 | Groenendaal et al. | 455/410 |
| 2004/0010490 | A1 * | 1/2004 | Mikami et al. | 707/3 |
| 2004/0057075 | A1 * | 3/2004 | Stewart et al. | 358/1.15 |
| 2004/0153884 | A1 * | 8/2004 | Fields et al. | 714/52 |
| 2004/0198426 | A1 * | 10/2004 | Squibbs et al. | 455/555 |
| 2004/0205149 | A1 * | 10/2004 | Dillon et al. | 709/217 |
| 2004/0219919 | A1 * | 11/2004 | Whinnett et al. | 455/442 |
| 2005/0020272 | A1 * | 1/2005 | Barve | 455/450 |
| 2005/0033821 | A1 * | 2/2005 | Shin et al. | 709/217 |
| 2006/0129631 | A1 * | 6/2006 | Na et al. | 709/203 |
| 2007/0005809 | A1 * | 1/2007 | Kobayashi et al. | 709/250 |
| 2007/0081498 | A1 * | 4/2007 | Niwano | 370/335 |
| 2007/0165575 | A1 * | 7/2007 | Niwano | 370/335 |
| 2008/0114950 | A1 * | 5/2008 | Graham | 711/161 |

FOREIGN PATENT DOCUMENTS

| | | |
|---|---|---|
| JP | 2003087248 A * | 3/2003 |
| WO | WO 97/10558 A1 | 3/1997 |
| WO | WO 01/28171 A1 | 4/2001 |
| WO | WO 01/33782 A1 | 5/2001 |
| WO | WO 01/45319 A1 | 6/2001 |
| WO | WO 02/15518 A2 | 2/2002 |
| WO | WO 02/15518 A3 | 2/2002 |
| WO | WO 02/32072 A2 | 4/2002 |
| WO | WO 02/32072 A3 | 4/2002 |
| WO | WO 02/39736 A2 | 5/2002 |
| WO | WO 02/063849 A1 | 8/2002 |
| WO | WO 03/001755 A1 | 1/2003 |
| WO | WO 03/045032 A1 | 5/2003 |

OTHER PUBLICATIONS

Nokia Corporation; *Nokia Multimedia Messaging—Show what you mean*; 2001; 16 pages; available at <http://www.nokia.com>.

Nokia Corporation; *Are you ready for Multimedia Messaging Service—An evolutionary approach to implementing MMS*; 2002; 12 pages; available at <http://www.nokia.com>.

3$^{rd}$ Generation Partnership Project; Technical Specification Group Services and System Aspects; Multimedia Broadcast/Multicast Service; Stage 1 (Release 6); 3 GPP TS 22.146; Mar. 2003; 17 pages; V6.2.0; 3$^{rd}$ Generation Partnership Project (3GPP™).

Wireless Application Protocol—WAP-250-PushArchOverview-20010703-a; *WAP Push Architectural Overview*; Jul. 2001; 24 pages; Version 03; Wireless Application Protocol Forum, Ltd.; available at <http://www.wapforum.org/>.

Wireless Application Protocol Architecture Specification—WAP-210-WAPArch-20010712; *WAP Architecture*; Jul. 2001; 24 pages; Version 12; Wireless Application Protocol Forum Ltd.; available at <http://www.wapforum.org/>.

Wireless Application Protocol—WAP-168-ServiceLoad-20010731-a; *Service Loading*; Jul. 2001; 18 pages; Version 31; Wireless Application Protocol Forum, Ltd.; avaliable at <http://www.wapforum.org/>.

Open Mobile Alliance—OMA-Downloaded-OTA-v1_0-20021219-C; *Generic Content Download Over the Air Specification—Version 1.0*; Dec. 2002; 40 pages; Version 19; Open Mobile Alliance, Ltd.; available at <http://www.openmobilealliance.org/>.

Open Mobile Alliance—OMA-Download-OTA-v1_0-20030221-C; *Generic Content Download Over the Air*; Feb. 2003; 40 pages; Candidate Version 1.0; Open Mobile alliance Ltd.

*Promoting Web-Enabled eBusiness—Authentication Architectures, Technologies, and Commerical Implementations*; Technical White Paper Series—e FORCE; 8 pages; available at <http://www.eforceglobal.com>.

*Token Authentication—A Briefing Note*; 3 pages; Aconite—Technical Forum; available at <http://www.aconite.net/technology+forum/token+authentication.htm> (visited Sep. 30, 2003).

Chinese Office action for corresponding CN App. No. 200580016056.5 dated May 27, 2010, pp. 1-24.

Chinese Office action for corresponding CN App. No. 200580016056.5 dated Jun. 5, 2009, pp. 1-18.

Chinese Office action for corresponding CN App. No. 200580016056.5 dated Sep. 2, 2010, pp. 1-29.

Chinese Office Action for related Chinese Patent Application No. 200580016056.6 dated Dec. 16, 2011, pp. 1-20.

Communication from European Patent Office, European Patent Application No. 05 708 685.2-1244, dated Oct. 8, 2012, pp. 1-10.

* cited by examiner

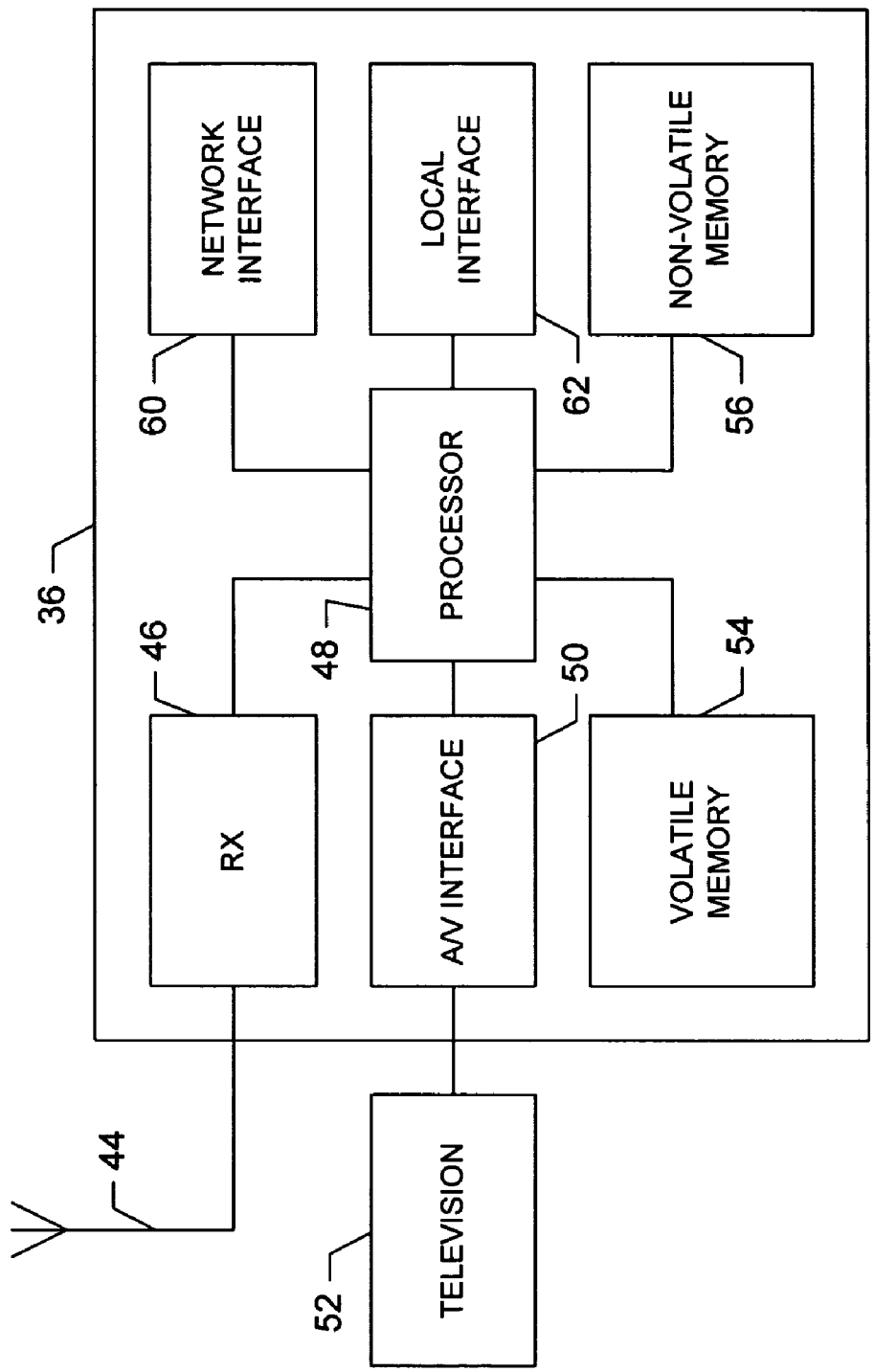

SYSTEM AND ASSOCIATED TERMINAL, METHOD AND COMPUTER PROGRAM PRODUCT FOR UPLOADING CONTENT

FIELD OF THE INVENTION

The present invention generally relates to systems and methods for uploading content and, more particularly, to systems and associated terminals, methods and computer program products for uploading content from terminals.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

An incredible amount of content, applications, services, and the like is already available for use on wireless devices. However, the quantity of information that will be accessible to mobile terminals will increase significantly in the coming years, as further technological advances will continue to diminish the gap between desktop and wireless units. For example, the use of mobile terminals such as digital cameras and mobile telephones that include digital camera functionality has significantly increased in recent years. And with the significant in crease in the use of digital cameras and mobile telephones with such functionality, the quality of images taken or captured by such cameras and mobile telephones has also significantly increased. For example, widely available digital cameras and mobile telephones including such fluctionality have, or in the near future are expected to have, the capability to create tens of mega-bits of content, which can be stored by the camera or mobile telephone, respectively.

Thus, while access to this plethora of information is exciting to the mobile world, storing the desired information and utilizing the various access techniques for transferring, or more particularly uploading, the desired information can become burdensome to the casual mobile terminal user. In this regard, the increase in the quantity of information that is and will be accessible to and/or stored by mobile terminals can place a heavy storage capacity burden on such mobile terminals. In mobile terminals that also operate as telecom devices, content storage is a particularly important issue since users expect sufficiently reasonable storage capacity for necessary communication purposes which they expect to be available.

To relieve at least a portion of the storage capacity burden on mobile terminals, techniques have been developed whereby mobile terminals are capable of transferring, or uploading, content from mobile terminals to servers or the like with increased storage capacity. As will be appreciated, however, such techniques can also have drawbacks. Whereas conventional techniques for uploading content are adequate, such techniques have a drawback in that they are limited in the amount of available control over the uploading of content. According to conventional uploading techniques, control over the uploading of content is typically limited. In this regard, conventional uploading techniques typically allow only very limited control over the time and manner of uploading content. For example, conventional techniques typically do not permit terminal users to tailor content uploading according to state of the network, such as network congestion. It would therefore be advantageous to have even more robust forms of upload control, especially for content that may take a while to upload and which senders and/or recipients might therefore want to be careful about transmitting and/or receiving, respectively, if the only available channel is an expensive channel.

Further, many conventional techniques for uploading content over the air assume, at least to some extent, that such content is uploaded in one communication, or uploading, session. For example, conventional Open Mobile Alliance (OMA) techniques for uploading content in accordance with the Over the Air (OTA) protocol assume, at least to some extent, that such content is uploaded in one uploading session. However, if the mobile terminal is uploading large content, the time to upload the content typically increases, thus increasing the cost of uploading the content, as well as the probability that the mobile terminal will encounter some type of error or interruption in transmission during the uploading process. For example, end users can interrupt the transmission of uploaded content if such end users desire to utilize the mobile terminal for an alternative purpose, such as to operate an application other than that required for uploading the content. Also, for example, an unexpected event, such as client error (e.g., dead battery, halt, crash, etc.) or network failure (e.g., out of the geographic coverage area, etc.) can interrupt the uploading of content.

Conventionally, when content is uploaded in a single uploading session, if an error or interruption in transmission occurs during the uploading process, the mobile terminal must restart the uploading process to completely upload the content. For example, if a mobile terminal encounters an error or other interruption in uploading content having a size of thirty-two mega-bytes over a General Packet Radio Services (GPRS) network, the mobile terminal typically must restart the upload to receive the content, even if the mobile terminal had already uploaded a significant portion of the content before the error or interruption. Several techniques, such as File Transfer Protocol (FTP) techniques, have been developed to recover an uploading session that has encountered an error or interruption. Such techniques, however, are not designed for wireless network environments. Also, such techniques are merely designed to recover an uploading session that has encountered a network connection error (e.g., modem failure) and do not permit the recovery of uploading sessions that are halted for other reasons.

SUMMARY OF THE INVENTION

In light of the foregoing background, embodiments of the present invention provide a system and associated terminal, method and computer program product for uploading content. The system, method and computer program product of embodiments of the present invention allow senders and recipients, as well as network operators and other entities, greater control over the uploading of content by allowing such entities to define instructions to which upload of the media content is subject. In this regard, embodiments of the present invention allow instructions to be defined so as to facilitate increased customization and optimization of uploading content. Embodiments also facilitate efficient uploading of content such as, for example, by specifying that the content be uploaded based upon traffic on the network over which the content is to be uploaded. Further, embodiments of the present invention facilitate inexpensive uploading of content such as, for example, by specifying that content be uploaded via a network that can transmit the content in a less expensive manner, as compared to other networks.

In addition to being capable of improving the upload of content, the system, and associated terminal, method and computer program product of embodiments of the present invention can be capable of recovering an upload session that has encountered an error, such as a sender (e.g., terminal) and/or network error. In this regard, received portions of upload content can be stored in a non-volatile cache along with an upload descriptor, information packets or the like that indicate the amount of upload content and status of the upload content. Thus, upon interruption of uploading the content, the upload descriptor and/or information packets can be utilized to determine the remaining portion of the content to complete the upload session. Alternatively, upon interruption of uploading the content, a bit length range of the received portion of the upload content can be utilized without an upload description and/or information packets, to upload the remaining portion of the content to complete the upload session.

According to one aspect of the present invention, a system is provided for uploading content. The system includes a sender capable of sending an upload request, where the upload request comprises a request to upload content from the sender to a recipient. The system also includes a network entity, such as the recipient, capable of operating an upload agent. The upload agent, in turn, is capable of receiving the upload request, and thereafter determining an upload schedule relating to the time and/or manner of uploading the content. More particularly, the sender can, but need not, be capable of receiving a trigger to send an upload request before sending the upload request. The sender can therefore be capable of sending the upload request in response to the trigger independent of interaction from a user of the sender. Irrespective of how the sender sends the upload request, the sender is then capable of uploading the content to the recipient in accordance with the upload schedule. After uploading the content, the sender can be further capable of deleting the content from memory of the sender after uploading the content to the recipient.

As explained below, the upload schedule can include one or more instructions, each of which can comprise any of a number of different instructions relating to the time and/or manner of uploading the content. For example, at least one instruction can be based upon state information regarding the recipient and/or the sender, such as a connectivity, location, actual movement and/or predicted movement of the recipient and/or the sender. Also for example, at least one instruction can be based upon state information regarding at least one network over which the content is uploaded, such as traffic on the network(s) and/or bandwidth available to the recipient and/or the sender on the network(s). In such instances, the sender can be further capable of receiving the state information before uploading the content such that the sender is capable of uploading the content based upon the state information.

In addition, for example, at least one instruction can define processing the content, such as by transcoding and/or truncating at least a portion of the content, and/or breaking the content into a plurality of portions. In such instances, the sender is further capable of processing the content such that in uploading the content the sender is uploading the processed content, or more particularly the transcoded and/or truncated content, and/or the portions of the content. In another example, at least one instruction defines at least one deadline for uploading the content such that the sender is capable of uploading the content based upon the deadline(s). In yet another example, the content includes a plurality of pieces, and as such, at least one instruction can comprise an ordering of the plurality of pieces of the content. In such instances, the sender can be capable of uploading at least a portion of the content based upon the ordering of the plurality of pieces of the content.

More generally, for example, at least one instruction can be based upon the content and network(s) over which the content is uploaded such that the sender is capable of uploading the content based upon the content and the network(s). At least one instruction can additionally or alternatively be based upon at least one upload time of the content, where the upload time(s) can be determined based upon the content and network(s). In such instances, the sender can be capable of uploading the content based upon the at least one upload time.

According to a further aspect of the present invention, the content comprises a plurality of data packets. In accordance with this aspect, the sender can be capable of sending an upload descriptor and thereafter uploading the content. In such instances, the sender and/or the network entity is capable of determining if an interruption occurs in uploading the plurality of data packets such that the recipient receives less than the plurality of data packets of the content. If an interruption occurs in uploading the plurality of data packets, then, the network entity can be capable of recovering the content based upon the upload descriptor such that the recipient receives the plurality of data packets. More particularly, the network entity can be capable of recovering the content by determining at least one remaining data packet to be uploaded to the recipient to thereby complete uploading of the plurality of data packets of the content. Thereafter, the network entity can instruct the sender to send the remaining data packet(s).

The sender can be capable of uploading the plurality of data packets and at least one information packet regarding at least one group of at least one data packet. In such instances, the network entity can be capable of monitoring the uploaded data packets to determine, based upon information packet(s), if an interruption occurs in uploading the plurality of data packets. Then, if an interruption occurs in uploading the plurality of data packets, the network entity can be capable of recovering the content such that the recipient receives the plurality of data packets.

Alternatively, if an interruption occurs in uploading the content, the sender can be capable of receiving a length of the received portion of the content such that the sender is capable of thereafter uploading a remaining portion of the content to thereby recover the content. More particularly, the sender can be capable of uploading a remaining portion of the content based upon a bit range of the remaining portion of the content. In this regard, the sender can be capable of receiving the length of the received portion of the content in accordance with a hypertext transfer protocol (HTTP) HEAD technique. In such instances, the sender can be capable of uploading the remaining portion of the content in accordance with a HTTP POST or a HTTP PUT technique, where the HTTP POST/PUT technique includes uploading the remaining portion of the content including header information comprising a bit range of the remaining portion of the content.

According to other aspects of the present invention, a terminal, method and computer program product are provided for uploading content. Therefore, embodiments of the present invention provide a system and associated terminal, method and computer program product for uploading content. The system and associated terminal, method and computer program product of embodiments of the present invention provide greater control over uploading content, as compared to conventional uploading techniques. In this regard, embodiments of the present invention allow senders, recipients, network operators and other such entities to define instructions to which the uploading of content is subject. In this regard, embodiments of the present invention allow instructions to be defined so as to facilitate fast, efficient and inexpensive uploading of content. And further in contrast to conventional techniques for uploading content, the system and associated terminal, method and computer program product of embodiments of the present invention can be capable of recovering an upload session that has encountered an error, such as a terminal and/or network error. Therefore, the system, and associated terminal, method and computer program product of embodiments of the present invention solve the problems identified by prior techniques and provide additional advantages.

BRIEF DESCRIPTION OF THE DRAWINGS

Figure 1:
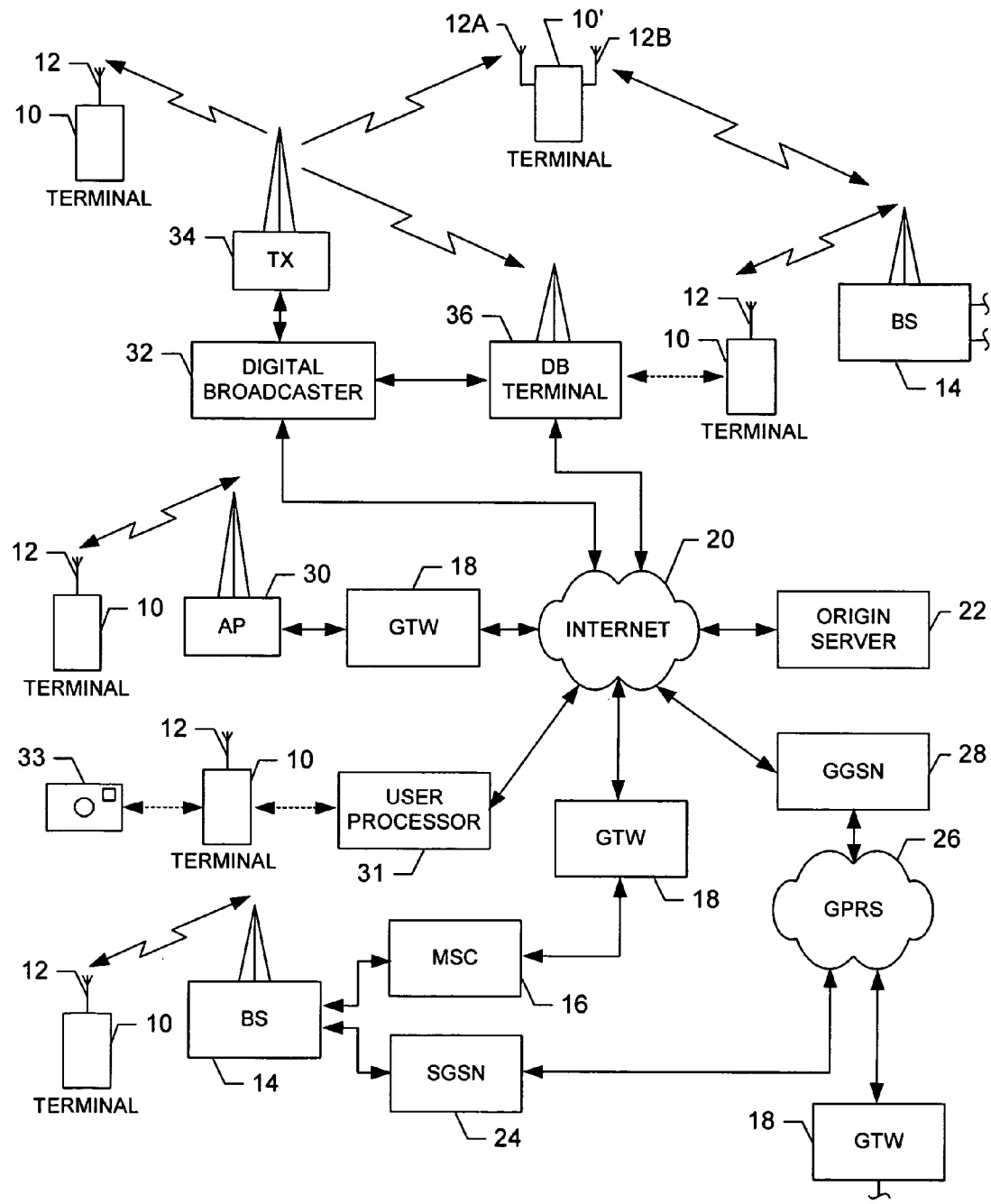
Figure 2:
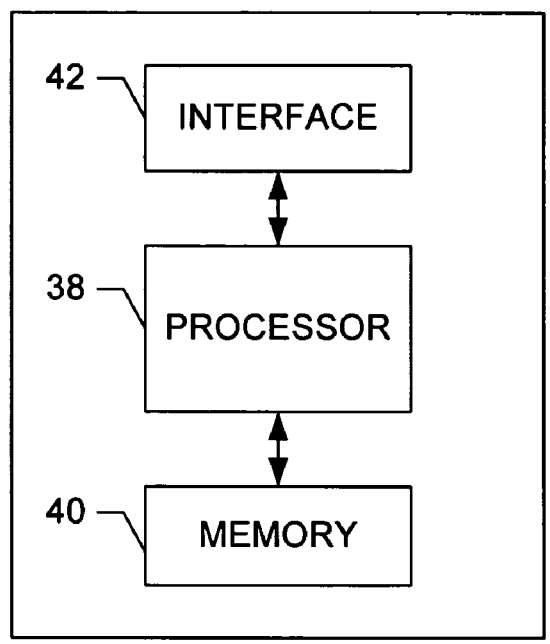
Figure 4:
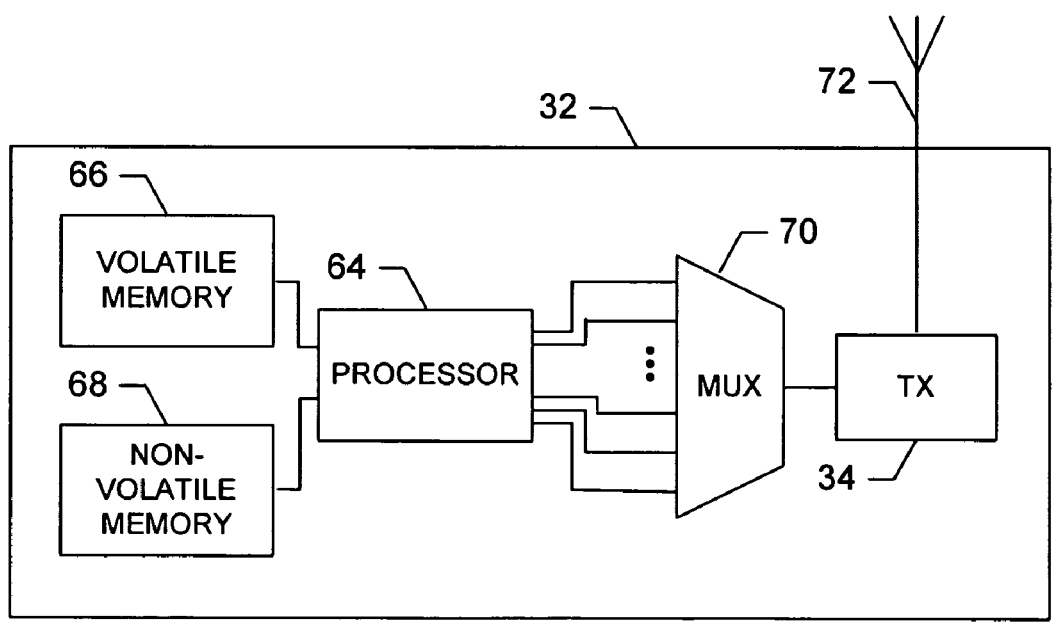
Figure 5:
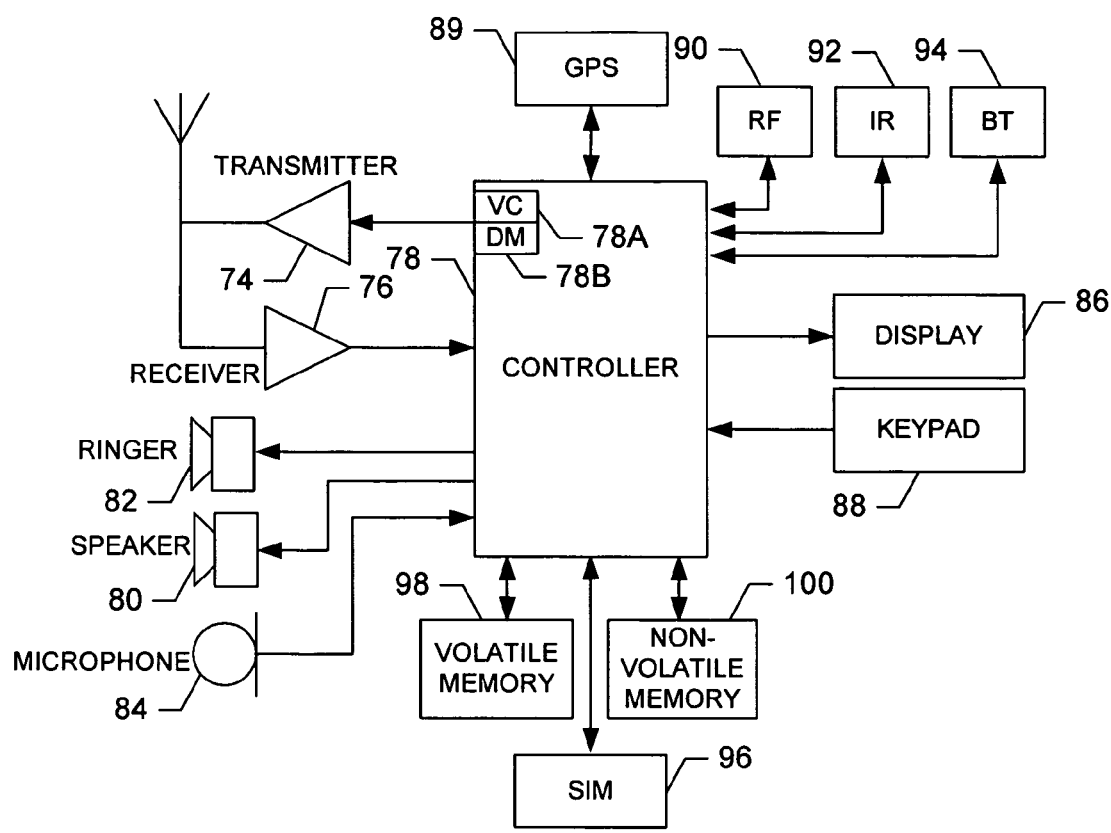
Figure 6:
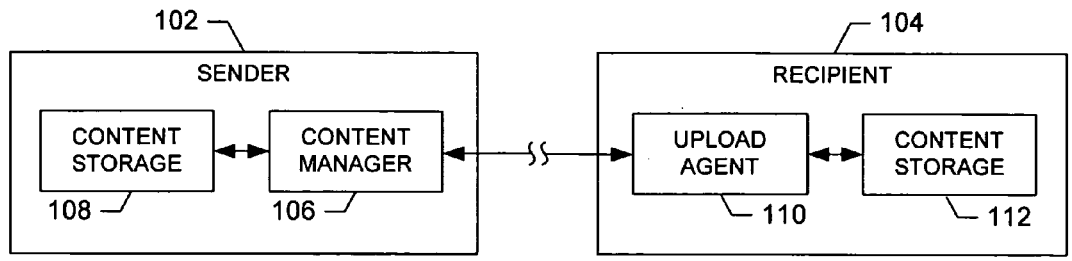
Figure 7:
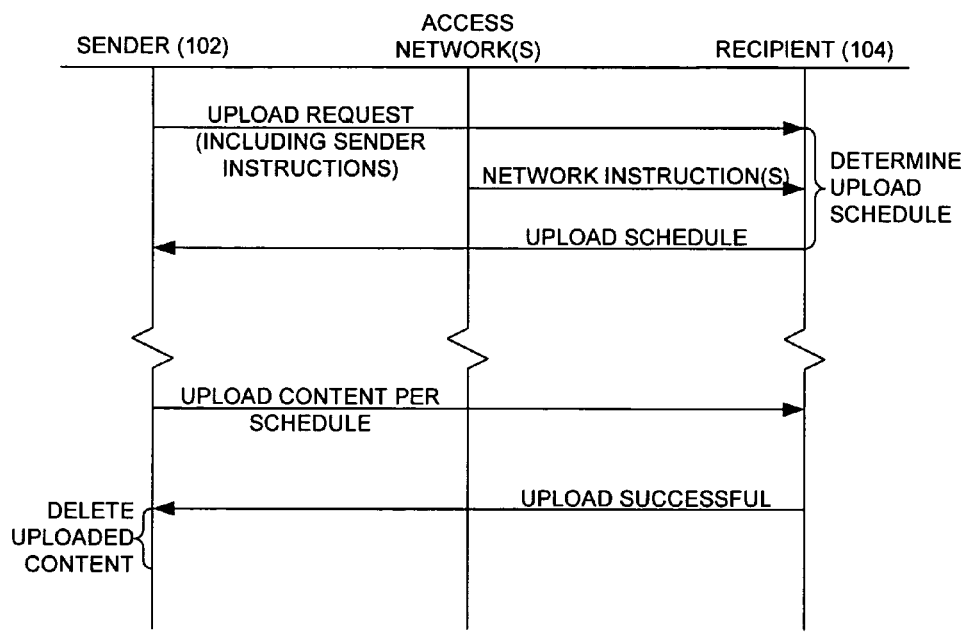
Figure 8:
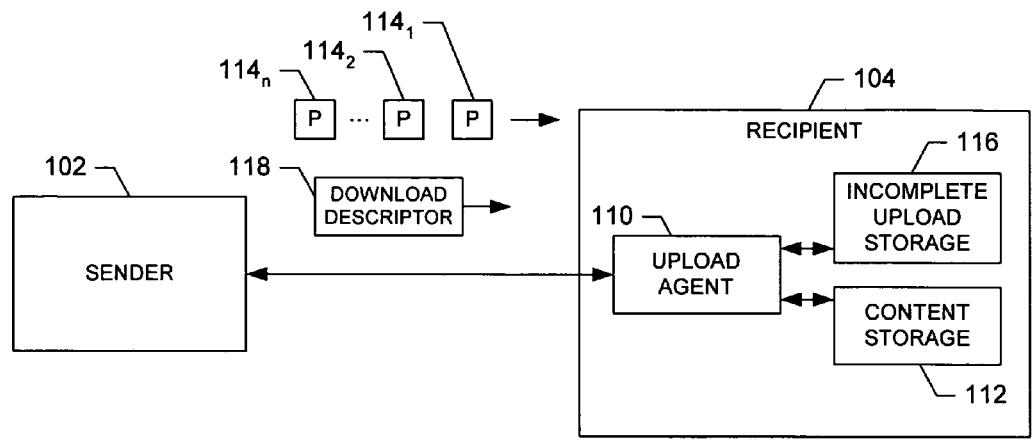
Figure 10:
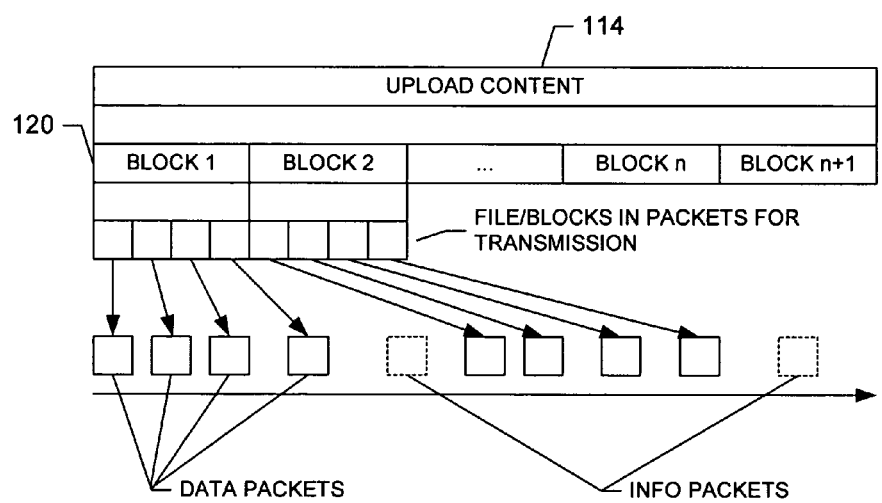
Figure 9:
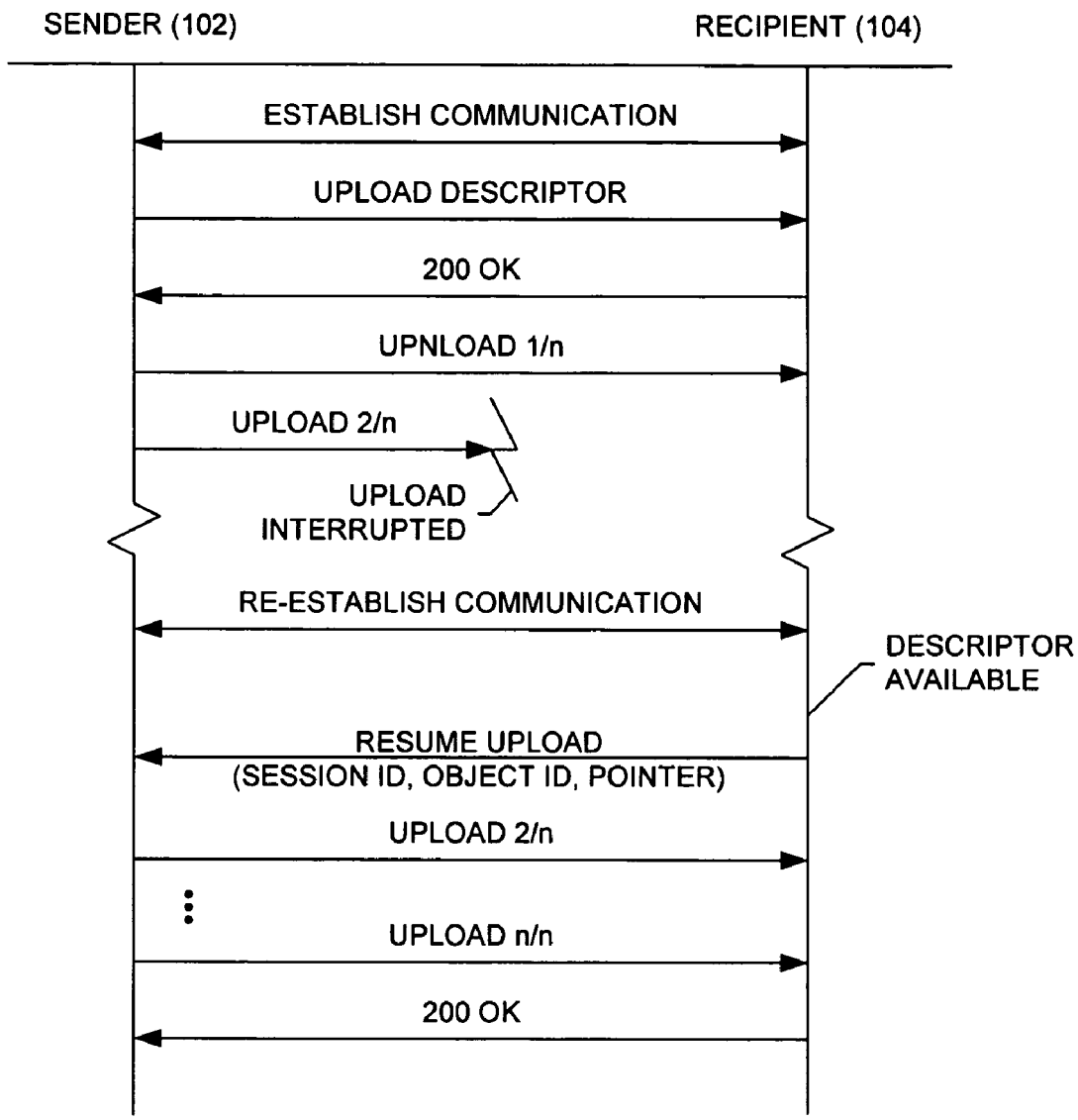
Figure 11:
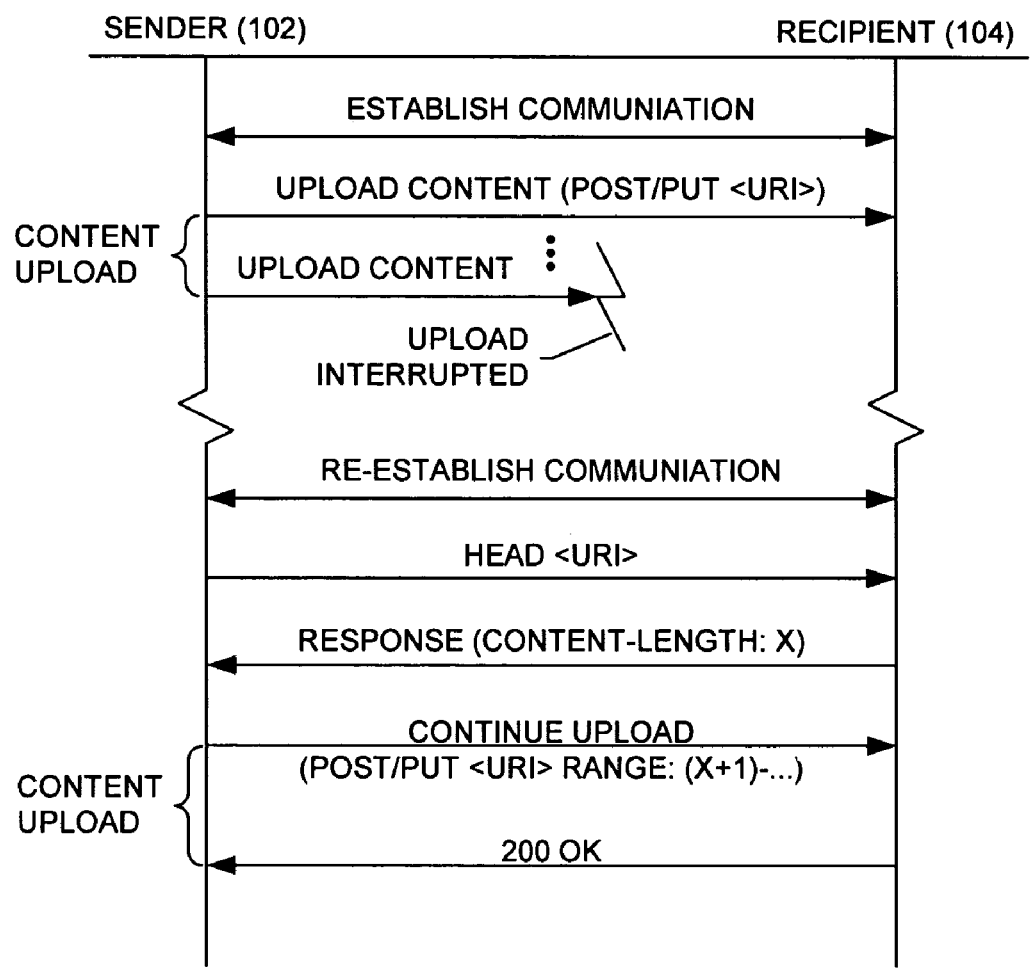

Having thus described the invention in general terms, reference will now be made to the accompanying drawings, which are not necessarily drawn to scale, and wherein:

FIG. 1 is a schematic block diagram of a wireless communications system according to one embodiment of the present invention including a cellular network and a data network to which a terminal is bi-directionally coupled through wireless RF links;

FIG. 2 is a schematic block diagram of an entity capable of operating as a terminal, origin server, digital broadcast receiver and/or a digital broadcaster, in accordance with embodiments of the present invention;

FIG. 3 is a functional block diagram of a digital broadcast receiver, in accordance with one embodiment of the present invention;

FIG. 4 is a functional block diagram of the digital broadcaster, in accordance with one embodiment of the present invention;

FIG. 5 is a schematic block diagram of a mobile station that may operate as a terminal, according to embodiments of the present invention;

FIG. 6 is a functional block diagram of a sender uploading content to a recipient, in accordance with one embodiment of the present invention;

FIG. 7 is a control flow diagram of elements of a system operating in accordance with a method for uploading content, in accordance with an embodiment of the present invention;

FIG. 8 is a functional block diagram of a sender uploading content to a recipient while accounting for recovery in the upload session, in accordance with one embodiment of the present invention;

FIG. 9 is a control flow diagram of elements of a system operating in accordance with a method for uploading content including recovering an interrupted upload session, in accordance with one embodiment of the present invention;

FIG. 10 illustrates upload content broken down into a number of groups or blocks of one or more data packets with one or more information packets added to the packet stream, in accordance with embodiments of the present invention; and FIG. 11 is a control flow diagram of elements of a system operating in accordance with a method for uploading content including recovering an interrupted upload session, in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI). In operation, the MSC is capable of routing calls and messages to and from the terminal when the terminal is making and receiving calls. The MSC also provides a connection to landline trunks when the terminal is involved in a call. Further, the MSC can be coupled to a server gateway (GTW) 18.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, as explained below, the processing elements can include one or more processing elements associated with an origin server 22, one of which being illustrated in FIG. 1.

In addition to the MSC 16, the BS 14 can be coupled to a signaling GPRS (General Packet Radio Service) support node (SGSN) 24. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 26. The packet-switched core network is then coupled to another GTW, such as a GTW GPRS support node (GGSN) 28, and the GGSN is coupled to the Internet. In addition to the GGSN, the packet-switched core network can also be coupled to a GTW 18.

By coupling the SGSN 24 to the GPRS core network 26 and the GGSN 28, devices such as origin servers 22 can be coupled to the terminal 10 via the Internet 20, SGSN and GGSN. In this regard, devices such as origin servers can communicate with the terminal across the SGSN, GPRS and GGSN. For example, origin servers can provide content to the terminal, such as in accordance with the Multimedia Broadcast Multicast Service (MBMS). For more information on the MBMS, see Third Generation Partnership Project (3GPP) technical specification 3GPP TS 22.146, entitled: *Multimedia Broadcast Multicast Service (MBMS)*, the contents of which are hereby incorporated by reference in its entirety.

In addition to being coupled to the BS 14, the terminal 16 can be wirelessly coupled to one or more wireless access points (APs) 30. The APs can comprise access points configured to communicate in accordance techniques such as, for example, radio frequency (RF), Bluetooth (BT), infrared (IrDA) or any of a number of different wireless networking techniques, including WLAN techniques. Additionally, or alternatively, the terminal can be coupled to one or more user processors 31. Each user processor can comprise a computing system such as personal computers, laptop computers or the like. In this regard, the user processors can be configured to communicate with the terminal in accordance with techniques such as, for example, RF, BT, IrDA or any of a number of different wireline or wireless communication techniques, including Universal Serial Bus (USB), LAN and/or WLAN techniques. One or more of the user processors can additionally, or alternatively, include a removable memory capable of storing content, which can thereafter be transferred to the terminal.

The terminal 10 can further be coupled to one or more portable electronic devices 33, such as digital cameras and/or other multimedia capturing, producing and/or storing devices. Like with the user processors 31, the terminal can be configured to communicate with the portable electronic devices in accordance with techniques such as, for example, RF, BT, IrDA or any of a number of different wireline or wireless communication techniques, including USB, LAN and/or WLAN techniques.

The APs 30 and user processors 31 may be coupled to the Internet 20. Like with the MSC 16, the APs and user processors can be directly coupled to the Internet. In one embodiment, however, the APs are indirectly coupled to the Internet via a GTW 18. As will be appreciated, by directly or indirectly connecting the terminals and the origin server 22, as well as any of a number of other devices, to the Internet, the terminals, as well as portable electronic devices coupled to such terminals, can communicate with one another, the origin server, etc., to thereby carry out various functions of the terminal (and portable electronic devices), such as to transmit data, content or the like to, and/or receive content, data or the like from, the origin server. As used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

Further, the terminal 10 can additionally, or alternatively, be coupled to a digital broadcaster 32 via a digital broadcast network, such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content, such as content for one or more television, radio and/or data channels, from the digital broadcaster. In this regard, the digital broadcaster can include, or be coupled to, a transmitter (TX) 34, such as a DVB-T TX. Similarly, the terminal can include a receiver, such as a DVB-T receiver (not shown). The terminal can be capable of receiving content from any of a number of different entities in any one or more of a different number of manners. In one embodiment, for example, the terminal can comprise a terminal 10' capable of transmitting and/or receiving data, content or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12A for receiving content from the DVB-T TX, and another antenna 12B for transmitting signals to and for receiving signals from a BS 14. For more information on such a terminal, see U.S. patent application Ser. No. 09/894,532, entitled: Receiver, filed Jun. 29, 2001, the contents of which is incorporated herein by reference in its entirety.

In addition to, or in lieu of, directly coupling the terminal 10 to the digital broadcaster 32 via the TX 34, the terminal can be coupled to a digital broadcast (DB) receiver 36 which, in turn, can be coupled to the digital broadcaster 32, such as directly and/or via the TX. In such instances, the digital broadcast receiver can comprise a DVB-T receiver, such as a DVB-T receiver in the form of a set top box. The terminal can be locally coupled to the digital broadcast receiver, such as via a personal area network. In one embodiment, however, the terminal can additionally or alternatively be indirectly coupled to the digital broadcast receiver via the Internet 20.

Referring now to FIG. 2, a block diagram of an entity capable of operating as a terminal 10, origin server 22, user processor 31, digital broadcast receiver 36, and/or a digital broadcaster 32 is shown in accordance with one embodiment of the present invention. Although shown as separate entities, in some embodiments, one or more entities may support one or more of a terminal, origin server, digital broadcast receiver, and/or a digital broadcaster, logically separated but co-located within the entit(ies). For example, a single entity may support a logically separate, but co-located, terminal and digital broadcast receiver. Also, for example, a single entity may support a logically separate, but co-located digital broadcast receiver and digital broadcaster.

As shown, the entity capable of operating as a terminal 10, origin server 22, digital broadcast receiver 36, and/or a digital broadcaster 32 can generally include a processor 38 connected to a memory 40. The processor can also be connected to at least one interface 42 or other means for transmitting and/or receiving data, content or the like. The memory can comprise volatile and/or non-volatile memory, and typically stores content, data or the like. For example, the memory typically stores content transmitted from, or received by, the entity. Also for example, the memory typically stores software applications, instructions or the like for the processor to perform steps associated with operation of the entity in accordance with embodiments of the present invention. In this regard, as explained below, the memory can store an upload agent capable of controlling the terminal in uploading content to a recipient, such as an origin server, digital broadcast receiver, or a digital broadcaster.

Reference is now made to FIG. 3, which illustrates a functional block diagram of a digital broadcast receiver 36, in accordance with one embodiment of the present invention. As shown, the digital broadcast receiver includes an antenna 44 for receiving signals from a digital broadcaster 32 and feeding the signals into a receiver (RX) 46. In turn, the receiver is capable of decrypting, demodulating and/or demultiplexing the signals, such as to extract content data. The receiver can feed the content data to a processor 48, which can thereafter decode the content data. The processor can then feed the decoded signal into an audio/video (A/V) interface 50, which can convert signals to a form suitable for display by a monitor, such as a television set 52.

The digital broadcast receiver 36 can include volatile memory 54, such as volatile Random Access Memory (RAM) including a cache area for the temporary storage of data. The digital broadcast receiver can also include non-volatile memory 56, which can be embedded and/or may be removable. The non-volatile memory can additionally or alternatively comprise an EEPROM, flash memory, hard disk or the like. The memories can store any of a number of pieces of information, content and data, used by the digital broadcast receiver to implement the functions of the digital broadcast receiver. For example, as indicated above, the memories can store content, such as that received from a digital broadcaster 32.

The digital broadcast receiver 36 can also include one or more interface means for sharing and/or obtaining data from electronic devices, such as terminals 10 and/or digital broadcasters 32. More particularly, the digital broadcast receiver can include a network interface means 60, for sharing and/or obtaining data from a network, such as the Internet 20. For example, the digital broadcast receiver can include an Ethernet Personal Computer Memory Card International Association (PCMCIA) card configured to transmit and/or receive data to and from a network, such as the Internet.

The digital broadcast receiver 36 can also include one or more local interface means 62 for locally sharing and/or obtaining data from electronic devices, such as a terminal. For example, the digital broadcast receiver can include a radio frequency transceiver and/or an infrared (IR) transceiver so that data can be shared with and/or obtained in accordance with radio frequency and/or infrared transfer techniques. Additionally, or alternatively, for example, the digital broadcast receiver can include a Bluetooth (BT) transceiver operating using Bluetooth brand wireless technology developed by the Bluetooth Special Interest Group such that the digital broadcast receiver can share and/or obtain data in accordance with Bluetooth transfer techniques. Further, the digital broadcast receiver can additionally or alternatively be capable of sharing and/or obtaining data in accordance with any of a number of different wireline and/or wireless networking techniques, including LAN and/or WLAN techniques.

Reference is now made to FIG. 4, which illustrates a functional block diagram of the digital broadcaster 32 of one embodiment of the present invention. Like the digital broadcast receiver 36, the digital broadcaster can include a processor 64 capable of carrying out the functions of the digital broadcaster. The digital broadcaster can also include volatile memory 66, such as volatile Random Access Memory (RAM) including a cache area for the temporary storage of data. The digital broadcaster can also include non-volatile memory 68, which can be embedded and/or may be removable. The non-volatile memory can additionally or alternatively comprise an EEPROM, flash memory, hard disk or the like. The memories can store any of a number of pieces of information, content and data, used by the digital broadcaster to implement the functions of the digital broadcaster. For example, as indicated above, the memories can store content, such as content for a television channel and other content for a number of other television, radio and/or data channels.

The digital broadcaster 32 can also include a multiplexer 70, which can be capable of multiplexing content for a number of television, radio and/or data channels. The multiplexer can then feed the resulting signal into a TX 34, which can be separate from the digital broadcaster, as shown in FIG. 1, or incorporated within the digital broadcaster, as shown in FIG. 4. Irrespective of where the TX is located relative to the digital broadcaster, the TX can receive the signal from the multiplexer for encryption, modulation, amplification and/or transmission, such as via an antenna 72. In this regard, for example, the digital broadcaster can be capable of directly or indirectly transmitting content to a digital broadcast receiver 36 and/or a terminal 10, such as in accordance with a digital broadcasting technique, such as DVB-T. For information on DVB-T, see European Telecommunications Standards Institute (ETSI) Standard EN 300 744, entitled: *Digital Video Broadcasting (DVB): Framing structure, channel coding and modulation for digital terrestrial television*, v.1.1.2 (1997) and related specifications, the contents of which are hereby incorporated by reference in their entirety.

In accordance with a number of digital broadcasting techniques, such as DVB-T, Internet Protocol (IP) Datacast (IPDC) can be utilized to provide audio, video and/or other content to terminals 10. In this regard, the digital broadcaster 32 can be capable of providing IP datacasting content to the terminal utilizing a digital broadcasting technique. As will be appreciated by those skilled in the art, digital broadcasting techniques such as DVB-T are essentially cellular in nature with a transmission site associated with each of a number of different cells. DVB-T, for example, uses MPEG-2 transport streams, and as such, IP data can be encapsulated into DVB transmission signals sent from the digital broadcaster, or more particularly the TX 34. Data streams including IP datagrams can be supplied from several sources, and can be encapsulated by an IP encapsulator (not shown). The IP encapsulator, in turn, can feed the encapsulated IP data streams into the data broadcasting (e.g., DVB-T) network.

The encapsulated IP data streams can then be transported to one or more transmission sites, where the transmission sites form cells of the data broadcasting network. For example, the encapsulated IP data streams can be transported to one or more transmission sites on an MPEG-2 transport stream for subsequent transmission over the air directly to the terminals, or to a receiver station serving one or more terminals. As will be appreciated, the MPEG-2 transport stream, from production by the IP encapsulator, to reception by the terminals or the receiver station, is typically uni-directional in nature. In this regard, IP packets containing the data can be embedded in multi-protocol encapsulation (MPE) sections that are transported within transport stream packets.

In addition to the IP packets, the MPE sections can also include forward error correction (FEC) information and time slicing information. By including information such as time slicing information, data can be conveyed discontinuously with the receiver (e.g., terminal 10), being capable of saving battery power by switching off when no data is being transmitted to the receiver. In other terms, in accordance with one time slicing technique, instead of using the current default method of continuous digital broadcasting (e.g., DVB-T) transmission, a time division multiplex-type of allocation technique can be employed (see, e.g., DVB-H standard). With such an approach, then, services can be provided in bursts, allowing a receiver to power down when the receiver is not receiving data, and allowing the receiver to power up to receive data packets, as necessary.

FIG. 5 illustrates a functional diagram of a mobile station that may operate as a terminal 10, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers, digital cameras and other types of voice, text and multimedia communications systems, can readily employ the present invention.

The mobile station includes a transmitter 74, a receiver 76, and a processor such as a controller 78 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA). The mobile station can additionally or alternatively be capable of operating in accordance with any of a number of different digital broadcasting techniques, such as the DVB technique (e.g., DVB-T, ETSI Standard EN 300 744). The mobile station can also be capable of operating in accordance with any of a number of different broadcast and/or multicast techniques, such as the MBMS technique (e.g., 3GPP TS 22.146). Further, the mobile station can be capable of operating in accordance with ISDB-T, DAB, ATSC techniques or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 78 includes the circuitry required for implementing the audio and logic functions of the mobile station. For example, the controller may be comprised of a digital signal processor device, a microprocessor device, and various analog to digital converters, digital to analog converters, and/or other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 78A, and may include an internal data modem (DM) 78B. Further, the controller may include the functionally to operate one or more software applications, which may be stored in memory.

The mobile station also comprises a user interface including a conventional earphone or speaker 80, a ringer 82, a microphone 84, a display 86, and a user input interface, all of which are coupled to the controller 78. The user input interface, which allows the mobile station to receive data, can comprise any of a number of devices allowing the mobile station to receive data, such as a keypad 88, a touch display (not shown) or other input device. In embodiments including a keypad, the keypad includes the conventional numeric (0-9) and related keys (#, *), and other keys used for operating the mobile station. In addition, the mobile station can include a positioning sensor, such as a global positioning system (GPS) sensor 89. In this regard, the GPS sensor is capable of determining a location of the mobile station, such as longitudinal and latitudinal directions of the mobile station.

The mobile station can also include one or more means for sharing and/or obtaining data from electronic devices, such as another terminal 10, an origin server 22, an AP 30, a digital broadcast receiver 36, a digital broadcaster 32 or the like, in accordance with any of a number of different wireline and/or wireless techniques. For example, the mobile station can include a radio frequency (RF) transceiver 90 and/or an infrared (IR) transceiver 92 such that the mobile station can share and/or obtain data in accordance with radio frequency and/or infrared techniques. Also, for example, the mobile station can include a Bluetooth (BT) transceiver 94 such that the mobile station can share and/or obtain data in accordance with Bluetooth transfer techniques. Although not shown, the mobile station can include one or more ports, such as a USB port, such that the mobile station can share and/or obtain data in accordance with a number of wireline techniques, such as in accordance with a USB technique. Also not shown, the mobile station may additionally or alternatively be capable of transmitting and/or receiving data from electronic devices according to a number of different wireline and/or wireless networking techniques, including LAN and/or WLAN techniques. In this regard, as shown in FIG. 1 with respect to terminal 10', the mobile station may include an additional antenna or the like to transmit and/or receive data from such electronic devices (e.g., digital broadcaster).

The mobile station can further include memory, such as a subscriber identity module (SIM) 96, a removable user identity module (R-UIM) or the like, which typically stores information elements related to a mobile subscriber. In addition to the SIM, the mobile station can include other memory. In this regard, like the digital broadcast receiver 36 and the digital broadcaster 32, the mobile station can include volatile memory 98. Also, again like the digital broadcast receiver and the digital broadcaster, the mobile station can include other non-volatile memory 100, which can be embedded and/or may be removable. The memories can store any of a number of pieces of information, and data, used by the mobile station to implement the functions of the mobile station. For example, the memories can store content, such as that received from an origin server 22 and/or a digital broadcast receiver. Also, for example, the memories can also store client applications such as a conventional Web browser for communicating in accordance with the hypertext transfer protocol (HTTP), a file transfer (e.g., FTP) application, a Telnet application, a peer-to-peer access application, or the like. Further, for example, the memories can store an application such as a content manager capable of managing content stored in memory of the mobile station, as explained further below.

As explained in the background section, terminals 10 are generally capable of storing only a limited amount of data. And as such, the increase in the quantity of information accessible to terminals can place a heavy storage capacity burden on the terminals. And to relieve at least a portion of the storage capacity burden on terminals, terminals are typically capable of transferring, or uploading, content to recipients (e.g., origin servers 22, user processors 31, digital broadcast receivers 36, digital broadcasters 32, etc.), the recipients typically including increased storage capacity. Conventional techniques, however, typically do not allow much control over the time and/or manner of uploading content. In addition, conventional techniques typically do not permit the recovery of uploading sessions that experience errors or interruptions in transmission during the uploading process. Embodiments of the present invention are therefore capable of controlling the time and/or manner of uploading content from a terminal to a recipient, such as an origin server, while permitting recovery of uploading sessions that experience errors or interruptions in transmission during the uploading process.

In accordance with embodiments of the present invention, a sender 102, such as a terminal 10, is capable of uploading content to a recipient, such as an origin server 22, user processor 31, digital broadcast receiver 36, digital broadcaster 32, or the like. Before uploading the content, however, the sender is capable of requesting that the recipient or another network entity control the time and/or manner of uploading the content to the recipient. In this regard, the time and/or manner of uploading the content can be controlled based upon, for example, the type, size and/or quality of the content to be uploaded. Additionally or alternatively, for example, the time and/or manner of uploading the content can be controlled based upon preferences as to time and/or location of the sender and/or recipient during the content upload, preferences as to the network over which the content is uploaded, as well as preferences as to the load and/or capacity of the network over which the content is uploaded. In addition or in the alternative, for example, the time and/or manner of uploading the content can be controlled based upon preferences as to a prioritization of one or more portions or pieces of the upload content, and/or predicted and/or actual movement of the sender. Further, for example, the time and/or manner of uploading the content can be controlled based upon information regarding other senders attempting to upload content, such as those senders attempting to upload content, such as to the same recipient, and/or at the same time and/or in the same manner as the respective sender.

Reference is now drawn to FIG. 6, which illustrates a functional block diagram of a sender 102 (e.g., terminal 10) uploading content to a recipient 104 (e.g., origin server 22, user processor 31, digital broadcast receiver 36, digital broadcaster 32, etc.), in accordance with one embodiment of the present invention. As shown, the sender is capable of operating an application, such as a content manager 106, which is capable of uploading one or more piece(s) of content from a content storage 108 in memory (e.g., non-volatile memory 100) of the sender, to the recipient. The recipient, in turn, is capable of operating an upload agent 110, which is capable of controlling the time and/or manner of uploading the content. In addition, the upload agent can be capable of receiving upload content from the content manager, and thereafter storing the content in a content storage 112 associated with the recipient.

As explained in greater detail below, in accordance with embodiments of the present invention, the upload agent 108 of the recipient 104 is capable of receiving an upload request from the content manager 106 of the sender 102, where the upload request identifies one or more piece(s) of content to upload from the sender to the recipient. In addition to receiving the upload request, or included within the upload request, the upload agent can receive or otherwise identify one or more instructions, such as one or more recipient instructions, sender instructions and/or network instructions, each relating to the time and/or manner of uploading the identified piece(s) of content. The upload agent can be capable of determining an upload schedule for uploading the identified piece(s) of content based upon the upload request and instructions. The upload agent can then send the upload schedule to the content manager. The content manager can upload content to the recipient in accordance with the upload schedule, where upon receipt, the recipient can store the content in content storage 112. After uploading the content, if so desired, the content manager can delete or otherwise remove the uploaded content from content storage 108 of the sender. And by deleting or otherwise removing the uploaded content, at least a portion of the storage capacity burden on the sender is capable of being relieved, such as for subsequent storage of other content.

As shown and described herein, the content manager 106 comprises software operated by the sender 102, and the upload agent 110 comprises software operated by the recipient 104. It should be understood, however, that the content manager and/or upload agent can alternatively comprise firmware or hardware, without departing from the spirit and scope of the present invention. Also, although the content manager is shown and described as being local to the sender, the content manager can alternatively be distributed from, and in communication with, the sender, such as across the Internet 20. Likewise, the upload agent can be located local to or distributed from the recipient.

As indicated above, the upload agent 110 can receive or otherwise identify one or more instructions, such as one or more recipient instructions, sender instructions and/or network instructions, each relating to the time and/or manner of uploading content from the sender 102 to the recipient 104. In this regard, to allow the recipient greater flexibility in receiving the upload content, embodiments of the present invention provide recipient instructions that can define how content is uploaded to a recipient 104 from one or more senders 102. As described below, the recipient instructions are typically defined by the recipient. To allow the sender of upload content greater flexibility in how content is uploaded, embodiments of the present invention also provide sender instructions that can define how the content is uploaded to the recipient. Further, embodiments of the present invention can also provide network instructions that allow network operators or other entities to define how content is uploaded over associated access networks. In this regard, content can be uploaded according to more universal instructions, such as instructions that apply to all upload content addressed to a particular recipient, or all upload content of a certain type regardless of the sender or recipient.

Whereas the following description will separately include a discussion of each of the three types of instructions defining the time and/or manner of uploading content, it should be understood that the system can upload content based on one or more of the different types of instructions. For example, the system can upload content based upon both recipient instructions and sender instructions. Alternatively, the system can upload content based upon all three of recipient instructions, sender instructions and network instructions. It will also be understood that the instructions can be defined on a content-by-content basis such that each piece of content, or each group of pieces of content, can be uploaded based upon different instructions selected from one or more of the different types of instructions (i.e., recipient instructions, sender instructions and/or network instructions). Additionally or alternatively, the instructions can be defined on a sender-by-sender basis such that each sender, or each group of senders, can upload content based upon different instructions selected from one or more of the different types of instructions.

As stated above, embodiments of the present invention provide recipient instructions that can define the time and/or manner of uploading content. The recipient instructions are typically specified by the recipient 104 of upload content. The recipient instructions can comprise any of a number of different instructions that define how the recipient receives upload content. It will be appreciated by those skilled in the art that various networks can transmit information at various transfer rates and require various amounts of bandwidth to transfer information. Further, it will be appreciated that cost to the system operator and, thus, the end users, can vary depending upon the network over which information is transmitted.

Therefore, the recipient instructions can include, for example, instructions based upon the connectivity of the recipient and/or respective senders. For example, the recipient 104 can define a recipient instruction that only permits uploading content when the recipient and/or respective sender 102 is connected to one of a limited number of access networks including mobile (e.g., 1G, 2G, 2.5G, 3G, etc.)

networks such as GPRS, EDGE, MBMS or DVB (e.g., DVB-T, DVB-H, etc.) networks, and/or any of a number of different wireline and/or wireless networks such as PAN (personal area network), LAN, MAN, WAN (e.g., Internet) and/or WLAN networks. In such instances, the recipient instructions may include the recipient and/or sender checking the connectivity of the recipient and/or sender, and reporting or otherwise indicating, to the content manager 106, the connectivity of the recipient and/or sender. As such, the recipient instructions can not only include the networks over which the content may be uploaded, but can also be based upon state information regarding the network(s) to which the recipient and/or respective senders are currently connected.

In addition to, or in lieu of, defining recipient instructions based upon the connectivity, one or more recipient instructions can be defined based upon recipient preferences. For example, a recipient 104 can define one or more recipient instructions that permit the sender to upload content at one or more predefined times, and/or that permit the sender to upload content based upon the location, movement and/or predicted movement of the sender 102 and/or recipient. In such instances, the recipient instructions can also be based upon state information regarding the location, movement and/or predicted movement of the sender and/or recipient.

Also, for example, the recipient can define one or more recipient instructions based upon one or more senders requesting to upload content to the recipient, including those sender(s) requesting to upload content at the same time and/or in the same manner. In this regard, the recipient can define a recipient instruction that prioritizes the time of uploading content from each of a number of senders based upon the respective senders, such as based upon the locations of the respective senders with respect to the recipient. In addition, for example, a recipient can define a recipient instruction that only permits uploading specified types of content, such as messages containing graphic, audio and/or video content. Further, the recipient can define a recipient instruction that only permits uploading specific portions or pieces of content, such as text portions of upload content that also contain, for example, graphic, audio and/or video content.

One or more recipient instructions can be defined based upon the type, size and/or quality of the content to be uploaded. In this regard, one or more recipient instructions can be defined such that the upload content is transcoded, truncated or otherwise processed based upon the type, size and/or quality of the content prior to being uploaded to the recipient 104. For example, the content manager 106 or other appropriate application can transcode the upload content whereby the upload content is reformatted so that the size of the upload content can typically be reduced, thereby facilitating fast and efficient uploading of the content. In other instances, if so specified, the content manager or other appropriate application can truncate the upload content, such as by removing various portions or pieces of the upload content, such as by removing less preferred portions (as such may be designated by the particular instruction) or removing larger portions. For example, upload content including text and video content can be truncated by removing the video content. In such instances, the truncated portion of the upload content can then be uploaded to the recipient. Further, for example, if so specified, the content manager or other appropriate application can break up the upload content into a plurality of portions. In such instances, each portion of the upload content can be subsequently uploaded in a particular order determined based upon, for example, the type, size and/or quality of the portions of the upload content.

In addition to, or in lieu of, uploading content based upon recipient instructions, the sender 102 can upload content based upon one or more sender instructions. The sender instructions are typically specified by the sender of upload content. The sender instructions can comprise any of a number of different instructions that define the time and/or manner of uploading content from the sender to a respective recipient 104. As described above, various networks can transmit information at various transfer rates and require various amounts of bandwidth to transfer information, and can have different associated costs to the end users. As such, like the recipient instructions, the sender instructions can comprise, for example, instructions based upon the connectivity of the sender and/or respective recipients, and/or instructions specifying that the upload content be processed, such as by being transcoded and/or truncated. In such instances, the sender can upload content to the respective recipients in a more cost efficient manner, such as by specifying that the content be uploaded over a lower cost network and/or by specifying that content requiring higher bandwidth (e.g., video content) be truncated from content when such content is uploaded over higher cost networks. In this regard, by specifying one or more sender instructions as such, the end users can receive a substantial cost benefit, particularly in instances in which the upload content includes objects (e.g., video and/or audio content) that take up more bandwidth when compared to other types of content.

In addition to, or in lieu of, defining sender instructions based upon the connectivity, and defining sender instructions to thereby transcode and/or truncate the media content, one or more recipient instructions can be defined that request uploading the content at one or more predefined times, and/or that request the sender uploading content based upon the location, movement and/or predicted movement of the sender 102 and/or recipient 104. Also, one or more sender instructions can be defined based upon an upload deadline. For example, a sender can specify that the content be uploaded to the recipient within a predefined period of time. And if the content is not uploaded by the predefined period of time, upload of the content can then be cancelled, with the sender receiving notification that the media content was non-deliverable within the predefined period of time.

Further, for example, a sender instruction can be defined that orders or prioritizes piece(s) or object(s) within the upload content, such as ordering graphic, audio and/or video content of the upload content. For example, the sender 102 can define a sender instruction that specifies the following order: (1) text content, (2) graphic content, (3) audio content and (4) video content. By ordering the objects within the upload content, the sender can specify which objects the sender prefers to be uploaded in instances in which only a portion of the content is uploaded to the recipient 104, as described below. Therefore, the sender can maintain expressiveness of content to the extent possible, even when the content is transcoded or truncated before being uploaded. For example, if the upload content included a sports video clip with audio commentary, the sender could order video at a higher priority than the audio. In this regard, the sender can preserve the expressiveness of the message, which is embodied in the video clip. Further, if the video clip is comprised of frames including images of players in a sporting event superimposed on background images (e.g., audience, field, sky etc.), the images of the players can be ranked at a higher priority that the background images. On the other hand, if the upload content included a song clip with an audio track and a video of the singer, the sender may order the audio a higher priority than the video.

In one typical embodiment, the sender 102 can specify sender instructions on a content-by-content and/or a recipient-by-recipient basis, with or without storing the sender instructions. For example, the content manager 106 that enables the sender to upload content to the recipient 104 can provide a user interface for constructing sender instructions on a content-by-content and/or recipient-by-recipient basis.

As indicated above, the sender instructions are typically sent to the upload agent 110 prior to the sender 102 uploading content. In one typical embodiment, for example, the upload request transmitted by the content manager identifies one or more pieces of content to upload, and includes one or more sender instructions along with other information (e.g., addressing information). In this regard, the sender instructions can be encoded in a separate header of the upload request. Alternatively, the sender instructions can be integrated into the upload request. Upon receipt of the upload request, then, the upload agent can determine if the upload request includes any sender instructions, and thereafter determine an upload schedule based at least in part upon the sender instructions.

In addition to, or in lieu of, the recipient instructions and/or the sender instructions, content can be uploaded from a sender 102 to a recipient 104 based upon one or more network instructions. The network instructions can be specified by the sender and/or the recipient. In this regard, the network instructions can be included within the sender instructions and/or the recipient instructions. The network instructions can additionally or alternatively be specified such as by a system operator, network operator or other entity, and received from a respective network. As previously indicated, various networks can transmit information at various transfer rates and require various amounts of bandwidth to transfer information, and can have different associated costs to the end users. Further, it will be appreciated that the time required to deliver the media content, as well as the efficiency with which the media content is delivered, can vary based upon an amount of traffic on the respective networks. That is to say, as more information is simultaneously transmitted over the respective networks (i.e., the more the network traffic), longer it can take to transmit the information, with the information being transmitted less efficiently. Therefore, the network instructions can comprise any of a number of different instructions that define the time and/or manner of uploading content to the recipient so as to deliver the media content in a quicker and more efficient manner. As such, network operators can utilize network instructions for load balancing, among other purposes.

For example, a network instruction can be defined that requires content with specific object types to be uploaded over one of a limited number of access networks, such as those identified above. In addition, or in the alternative, a network instruction can be defined based upon an amount of traffic on the network over which the content is to be uploaded. For example, a network instruction can specify an order of preference of network types over which to upload content. The network instruction can further specify that, should a more preferred network type have network traffic above a threshold, the media content will be delivered via the next lowest preferred network that has network traffic below the threshold.

Alternatively, the network instruction can be defined without an order of preference of network types. In such instances, the network instruction can specify that the sender 102, or more particularly the content manager 106, upload content when the traffic on the network over which the content is to be uploaded is below the threshold, or if the traffic is above the threshold, hold (e.g., store) the content until the traffic on the network drops below the threshold. Also, for example, a network instruction can be defined that specifies uploading content based upon the object(s) or piece(s) that comprise the content, and the network over which the content is to be uploaded. In such instances, the network instruction can be based upon an amount of time required to upload the content via the network over which the content is to be uploaded. The amount of time required to upload the content, in turn, can be based on a number of different factors in addition to the content and the network. For example, the amount of time can be based upon the traffic on the network.

Irrespective of how the amount of time is determined, the network instruction in such instances, like before, can specify that, should the network over which the content is to be uploaded require an amount of time above a threshold, the content manager 106 can truncate, transcode or otherwise reduce the size of the upload content such that the amount of time required to deliver the media content to the recipient 104 is below the threshold. Alternatively, in instances in which the network over which the content is to be uploaded has the capability to deliver the upload content within the threshold time, the network instruction can be met without reducing the size of the upload content. In such instances, the network instruction can specify that the content manager upload the entire upload content when the amount of time required to upload the content is below the threshold, or if the amount of time is above the threshold, hold (e.g., store) the upload content until the amount of time drops below the threshold, such as when traffic on the network decreases.

A network instruction can also be defined based upon available bandwidth to the recipient 104 and/or the sender 102 within the respective networks over which the content is to be uploaded. In this regard, when a number of senders and recipients 104 are connected to the respective networks, an amount of bandwidth is allocated to each sender and recipient. Thus, the network instruction can specify that the content manager 106 upload the content when the bandwidth available to the recipient and/or sender is above a threshold. If the available bandwidth to the recipient and/or sender is below the threshold, then, the network instruction can specify that the content manager hold (e.g., store) the upload content until the amount of time drops below the threshold, such as when traffic on the network decreases. In this instance, the recipient and/or sender can be advised upon the eventual upload of the content that the content could have been uploaded sooner if additional bandwidth had been available, and the recipient and/or sender may be presented with the opportunity to upgrade its service to obtain additional bandwidth.

In instances in which the network instructions are based directly or indirectly on network traffic or bandwidth available to the recipient 104 and/or sender 102, the network instructions may include the recipient and/or sender checking the state of one or more of the networks, such as traffic on the networks and/or bandwidth available on the networks. The recipient and/or sender can thereafter report or otherwise indicate, to the content manager 106, the state of the network(s). As such, the network instructions can be based upon state information regarding traffic on the respective networks and/or bandwidth available on the networks.

The network instructions can be stored in any of a number of different locations and, in embodiments where the network instructions are defined by the recipients 104 and/or the senders 102, the network instructions are typically stored in a manner similar to the recipient instructions and/or the sender instructions, respectively. In embodiments where the network instructions are not defined by the recipients or the senders, however, the network instructions can be stored by a system or network operator, or other entity, for example, and thereafter sent to the upload agent 110, typically before the upload agent determines the upload schedule in response to a respective upload request. In such instances, the network instructions can be associated with respective networks over which the content can be uploaded.

Although a number of recipient instructions, sender instructions and network instructions have been described above, it will be appreciated that the instructions described are merely representative of the recipient instructions, sender instructions and network instructions capable of being defined in accordance with embodiments of the present invention. In this regard, any of a number of different instructions can be specified by the sender 102, the recipients 104 and/or other capable entities (e.g., a system operator). Thus, the foregoing description of the specific instructions is provided only as an example of the many different instructions that can define uploading of content and, therefore, should not be construed to limit the present invention.

Having described a number of different recipient instructions, sender instructions and network instructions, a method of uploading content from a sender 102 to a recipient 104 in accordance with one embodiment of the present invention will now be described. More particularly, for example, FIG. 7 illustrates a control flow diagram between a sender 102, a recipient 104 and one or more access networks, where the sender desires to upload content addressed to the recipient, as shown in FIG. 6.

As shown, the method of uploading content begins with the sender 102, or more particularly the content manager 106, selecting or receiving a selection of one or more pieces of content to be uploaded to the recipient 104, where the upload content can include a number of pieces or objects, such as text, graphic, video and/or audio content. The content manager can select piece(s) of content in any of a number of different manners. For example, the content manager can select piece(s) of content based upon the type, size and/or quality of the respective piece(s) of content. Additionally or alternatively, for example, the content manager can select piece(s) of content based upon an amount of time the content storage 108 has stored the respective piece(s) of content, such as to upload the oldest piece(s) of content. Similarly, the content manager can receive a selection of piece(s) of content in any of a number of different manners, such as via user input.

Irrespective of how the content manager 108 selects or receives a selection of piece(s) of content, upon selecting the content to be uploaded, the sender 102, or more particularly the content manager, can identify the piece(s) of upload content in an upload request, which can also include information necessary to describe the content (e.g., size, quality, etc.) and addressing information, and information identifying the intended recipient of the upload request and upload content. In addition, the upload request can further include one or more sender instructions from the sender. It will be appreciated, however, that the upload request need not include any sender instructions. It will also be appreciated that the sender may be capable of storing, and may have stored, one or more sender instructions, but generate the upload request without any sender instructions, if so desired.

After forming the upload request, the sender 102, or more particularly the content manager 106 can transmit the upload request to the recipient 104, or more particularly the upload agent 110. Upon receipt of the upload request, the upload agent can determine an upload schedule for uploading one or more of the identified piece(s) of content. In this regard, the upload agent can determine whether upload of the identified piece(s) of content is subject to any recipient instructions, sender instructions and/or network instructions. If uploading the content is not subject to any such instructions, the upload agent can determine an upload schedule that permits the content manager to upload the content at the sender's discretion. If uploading the media content is subject to any recipient instructions, sender instructions and/or network instructions, however, the upload agent can determine the upload schedule to include such instructions. After determining the upload schedule based upon the instructions, the upload agent can transmit the upload schedule to the content manager to thereby cause the content manager to upload the content in accordance with the upload schedule.

More particularly as to determining an upload schedule, the upload agent 110 can interpret the upload request to determine whether the upload request includes any sender instructions. For example, the upload agent can parse the upload request and interpret the content of the upload request to identify any sender instructions. The upload agent can also determine whether the content is to be uploaded based upon any recipient instructions, such as by determining whether any recipient instructions stored by the recipient are associated with the sender 102 and/or the upload content, as such may be determined based upon information included within the upload request. Further, the upload agent can determine whether delivery of the media content is subject to any network instructions, such as by determining whether any network instructions are contained within the upload request (if designated by the sender), whether any network instructions are stored by the recipient (if designated by the recipient) and/or, as shown in FIG. 7, receiving any network instructions from one or more access network(s) over which the sender is capable of uploading the content (if designated by another entity such as a system operator).

If the content is subject to any recipient, sender or network instructions, the upload agent 110 can determine the upload schedule based upon the instructions. The upload agent can determine the upload schedule in any of a number of different manners. For example, the upload agent can determine the upload schedule to include all of the instructions to which uploading of the content is subject such that the content manager 104 operates in accordance with the upload schedule to upload the content when all of the instructions are satisfied. As will be appreciated, in some instances one instruction may specify uploading content in one manner, while another instruction specifies uploading content in another manner. In such instances in which a conflict exists between the recipient instructions, sender instructions and/or the network instructions, then, the upload agent can determine an upload schedule to include one or more of the respective instructions in any of a number of different manners. For example, the upload agent can determine the upload schedule to include the instructions in a hierarchical order, such as by including network instructions over conflicting recipient and sender instructions. Similarly, for example, the upload agent can determine the upload schedule to include recipient instructions over conflicting sender instructions. In an alternative embodiment, when the upload agent identifies one or more conflicting instructions, the upload agent can be configured to notify the sender 102 and/or recipient 104 of the conflict and the inability of the sender to upload the content.

Irrespective of how the upload agent 110 determines the upload schedule, at any one or more points in time after the upload agent determines the upload schedule, the upload agent can pass at least a portion of the upload schedule to the content manager 106 so that the content manager can thereafter upload the content to the recipient in accordance with received portion of the upload schedule. For example, the upload agent can pass the entire upload schedule to the content manager so that the content manager can upload all of the content to the recipient in accordance with the entire upload schedule. Alternatively, for example, the upload agent can pass portions of the upload schedule, each portion specifying upload of respective portions of the content. In such instances, the upload agent can maintain the upload schedule, and pass a portion of the upload schedule for each portion of content as the upload schedule directs uploading of the respective portion of content. In yet a further alternative, the upload agent can forgo passing any of the upload schedule to the terminal, and instead maintain the upload schedule and instruct the content manager to upload content to the recipient as directed by the upload schedule.

Irrespective of whether the upload agent 110 passes the entire upload schedule, portions of the upload schedule, or none of the upload schedule to the content manager 106, however, as will be appreciated, depending upon the upload schedule, the uploading of content to the recipient 104 can occur at any one or more points in time after the content manager receives a respective portion of the upload schedule, from immediately after receiving the respective portion of the upload schedule, to anywhere from seconds, to minutes to days after receiving the respective portion of the upload schedule.

In accordance with the upload schedule, then, the content manager 106 can upload content from the content storage 108 of the sender 102 to the recipient. If required by the upload schedule, however, the content manager can process the content accordingly before uploading the content. For example, the content manager can transcode and/or truncate the content. Also, if required by the upload schedule, the recipient 104 and/or sender can check the state of the recipient, sender and/or network over which the content is to be uploaded, and thereafter report or otherwise indicate, to the content manager 106, the state of the recipient, sender and/or network. As indicated above, various instructions can be based upon the connectivity, location, actual movement and/or predicted movement of the recipient and/or sender. Similarly, for example, network instructions can be based upon the traffic on respective networks and/or bandwidth available to the recipient and/or sender on respective networks. As such, uploading content in accordance with an upload schedule that includes such instructions can be based upon state information such as the access network to which the recipient and/or respective senders are currently connected, the location, actual movement and/or predicted movement of the recipient and/or sender. Additionally or alternatively, uploading content in accordance with such an upload schedule can be based upon state information such as the traffic, or available bandwidth, on the network over which the content is to be uploaded.

In instances based upon state information of the sender 102, recipient 104 and/or network, the recipient and/or sender can be capable of checking the state of the recipient, sender and/or network, as such may be represented by the state information, and thereafter reporting or otherwise indicating, to the content manager 106, the state of the recipient, sender and/or network. As such, when the upload schedule includes a recipient instruction requiring the state of the recipient, sender and/or network, the content manager can be capable of receiving the respective state information from the recipient and/or sender, which can set, change or otherwise update the state information when the state of the recipient, sender and/or network changes. For example, after moving from a 2G network to a WLAN network, the recipient can update the connectivity as indicated by state information capable of being received by the content manager. As will be appreciated, the state information can be updated at any one or more points in time, such as periodically or in response to change in the state of the recipient, sender and/or network.

Irrespective of how the sender 102 uploads the content to the recipient 104 in accordance with the upload schedule, as the recipient receives the upload content, the recipient, or more particularly the upload agent 110, can store the upload content, such as in content storage 112. Thereafter, the upload agent can acknowledge the upload. More particularly, upon completion of the upload process, the recipient, or more particularly the upload agent, can send an acknowledgement to the terminal, or more particularly the content manager 106. In this regard, the acknowledgement can indicate that the content manager successfully uploaded content to the recipient. Upon receiving the acknowledgement, then, the content manager can delete or otherwise remove the upload content from the content storage 108, thereby relieving at least a portion of the storage capacity burden on the sender, such as for subsequent storage of other content.

As indicated above, the content manager 106 can be adapted to select one or more piece(s) of content. As also indicated above, the content manager can also be adapted to delete the upload content after receiving an acknowledgement of a successful upload from the recipient 104. Thus, as will be appreciated, in various instances, it may be desirable to configure the content manager to select content, upload the selected content, and thereafter delete the upload content from the content storage 108 without user interaction, such as to automatically manage the storage capacity of the content storage of the sender 102. In such instances, it also may be desirable to configure the upload agent 110 to push an upload schedule to the sender such that the content manager can thereafter automatically upload content in accordance with the upload schedule, and thereafter delete the upload content from the content storage of the sender. In such instances, it may be further desirable to push the upload schedule to the sender without further interaction from a user of the sender.

In accordance with one embodiment of the present invention, then, the upload agent 110 or another entity can communicate with the sender in accordance with a service loading architecture, such as the WAP service loading architecture, to thereby initiate delivery of an upload schedule to the sender. In this regard, for example, the upload agent (or other entity) can be capable of sending digitally signed service loading content (i.e., trigger) to the sender 102. After the upload agent (or other entity) sends the digitally signed service loading content, the sender can pull an upload schedule without user interaction. Before pulling the upload schedule, however, the sender can, again without user interaction, select one or more piece(s) of content to upload to the recipient 104. Also before pulling the content, the sender can automatically authenticate the service loading content by verifying the digital signature with the service loading content. In this regard, the sender can use a public key sent to the sender, such as by the upload agent (or other entity), to verify the digital signature. By verifying the digital signature, the sender can verify that the service loading content originated at an authorized upload agent (or other entity), and can verify that the service loading content identifies an upload schedule from the recipient as being authorized.

If the sender 102 successfully authenticates the service loading content, the sender can pull or otherwise download a respective upload schedule from the recipient. In this regard, the sender can generate an upload request identifying piece(s)

of upload content, and including, for example, information necessary to describe the content (e.g., size, quality, etc.), addressing information, and information identifying the intended recipient 104 of the upload request and upload content. The sender can thereafter send the upload request to the upload agent 110 as before. Upon receipt of the upload request, the recipient can respond, as before, by determining an upload schedule and thereafter sending the upload schedule to the sender. The sender can receive the upload schedule, and as before, upload content in accordance with the schedule, and upon receiving an acknowledgement of a successful upload, delete the upload content. For more information on such a technique for pushing an upload schedule to the sender, see U.S. patent application Ser. No. 10/689,396 entitled: System, Method and Computer Program Product for Downloading Pushed Content, filed Oct. 20, 2003, the contents of which are hereby incorporated by reference in its entirety.

As explained in the background section, if the sender 102, such as a mobile terminal, is uploading large content, such as to a recipient 104, the time to upload the content typically increases, thus increasing the probability that the sender will encounter some type of error or interruption in transmission during the upload process. Conventionally, when content is uploaded in a single upload session, if an error or interruption in transmission occurs during the upload process, the sender must restart the upload process to completely upload the content. Thus, embodiments of the present invention may be capable of not only uploading content to a recipient, but also be capable of recovering an upload session that has encountered a sender error, as well as a network error. Embodiments of the present invention can recover an upload session in any of a number of different manners. As described herein, the system can be capable of recovering an upload session between a sender and a recipient directly or via a proxy. It should be understood, however, that the system can be capable of recovering an upload session between a sender and a recipient, where the sender uploads content to the recipient without first requesting and receiving an upload schedule, and thus in a manner independent of an upload schedule. It should also be understood that the system can be capable of recovering an upload session between the sender and any other device, where the uploaded content comprises any one or more of point-to-point, uni-cast, multicast and broadcast content.

Reference is now drawn to FIG. 8, which illustrates a functional block diagram of a sender 102 uploading content to a recipient 104, in accordance with one embodiment of the present invention. As before, the recipient is capable of operating an upload agent 110 capable of receiving upload content 114, such as in accordance with HTTP. Also as before, the upload agent is capable of accessing content storage 112. In addition, the upload agent can be capable of accessing an incomplete download content storage 116 such as a cache, where the incomplete download content storage of one embodiment comprises non-volatile memory.

As explained in further detail below, in accordance with one embodiment of the present invention, a modified Open Mobile Alliance (OMA) download Over-The-Air (OTA) session is utilized for upload recovery. For more information on the OMA OTA architecture, see Open Mobile Alliance, *Generic Content Download Over the Air*, OMA-Download-OTA-v1_0-20030221-C, the contents of which are incorporated herein by reference in its entirety.

With reference to the control flow diagram of FIG. 9, a method of upload recovery in accordance with one embodiment of the present invention generally includes the sender 102 establishing communication with the recipient 104, such as directly or via a proxy, gateway (e.g., GTW 20) or the like, to upload content 114 to the recipient. If so desired, as the sender establishes communication with the recipient, the sender can be authenticated to the recipient, such as in accordance with any of a number of different manners. After establishing communication with the recipient, the sender can send an upload descriptor 118 to the recipient. The upload agent 110 can receive the upload descriptor, and thereafter store the upload descriptor in the incomplete download storage 116. The upload descriptor can include any of a number of different pieces of information to facilitate the sender in uploading content, but in one embodiment, the upload descriptor includes attributes such as size of the upload content and a uniform resource identifier (URI) of a location within content storage of the recipient to store the content. Additionally, the upload descriptor can include information regarding a preferred time, place and technology for use in uploading the content.

After receiving the upload descriptor 118, the upload agent 110 can acknowledge receipt of the upload descriptor, such as by sending a 200 OK message to the sender 102. Upon receipt of the acknowledgement from the upload agent, the sender can begin uploading content 114 to the recipient 104, or more particularly to the upload agent. For example, the sender can upload content to the recipient in accordance with an HTTP POST or HTTP PUT technique. In this regard, the content can be uploaded in a number of content data packets $114_1$, $114_2, \ldots 114_n$. The upload agent can then store each packet in the incomplete download storage 116 as the upload agent receives each packet. As will be appreciated, the sender can upload the content to the recipient across a uni-directional or bi-directional network. And as will also be appreciated, the sender can upload the content independent of an upload schedule, such as in a manner described above with respect to FIG. 7.

During the upload session, between groups or blocks 120 of one or more packets, an information packet can be added to the packet stream, as shown in FIG. 10. In this regard, the upload agent 110 can receive and thereafter store each information packet, such as in the incomplete download storage 116, to facilitate upload recovery. Each information packet can generally include information as to the number of packets in a block of packets the upload agent is expected to receive before a subsequent information packet or other information relating to the packets, such as a sequence of one or more cyclic redundancy codes (CRCs). Alternatively, each information packet can include information as to the number of packets in the block of packets the upload agent should have received after a previous information packet or other information relating to the packets. In addition to information regarding a number of packets in the block of packets before or after the information packet, each information packet can include information (e.g., sequence of packet CRCs) uniquely describing the packets before or after the information packet, as well as one or more identifiers identifying the sender 102, the information packet, requested content and/or the upload session.

In accordance with various protocols, such as the User Datagram Protocol (UDP), packets may arrive at the upload agent 110 in an order different from the order the sender 102 uploaded the packets. Conventionally, however, packets in accordance with protocols such as UDP do not include information relating to the sequence of the packets or the total number of data packets that comprise the upload content 114. Thus, in addition to the number of packets in a block 120 of packets before or after an information packet, each information packet can include an identifier that identifies placement of the respective data packet in relation to the other data packets of the content. Alternatively, each information packet can include a table uniquely identifying the block of packets before or after the respective information packet, each of the packets referenced by the respective information packet, and the correct order of the packets. For example, each information packet can include a table including the CRCs or other uniquely describing data fields of the packets in the block of packets before or after the respective information packet. By directly or indirectly identifying the order of the data packets, the upload agent can subsequently order the packets in the same order that the recipient uploaded the packets.

As will be appreciated, the blocks 120 of packet(s) can each include the same number of packets, or the number of packets in each block of packet(s) can vary from block to block. As will also be appreciated, in instances in which the blocks of packet(s) include the same number of packets, an information packet may, but need not, be sent only once at the beginning of the download session. In addition, although the sender 102 can include information packets between blocks of data packet(s), the information otherwise included in the information packets can alternatively be added to one or more of the data packets. Further, as explained above, upload agent 110 can receive and thereafter store each information packet to facilitate upload recovery. However, the upload agent need not maintain all of the received information packets in storage. For example, the upload agent can be configured to store only one or more of the latest received information packets.

During the upload session, then, the upload agent 110 can utilize the information packets to monitor the received data packets. More particularly, the upload agent can monitor the received data packets to track the number and accuracy of the received packets, blocks of packet(s) or portion of the upload content 114. In this regard, the number of received packets, blocks 120 of packet(s) or portion of the upload content can be compared to an identified number of packets in or size of the upload content at any one or more points during the upload session. The accuracy of the received packets, blocks of packet(s) or portion of the requested content can be verified in any of a number of different manners, such as by utilizing CRC data in each of the packets. Similarly, a CRC or any other characteristic of accuracy can be included in each transmitted packet, block of packet(s) or portion of the upload content.

By tracking the number and accuracy of the received packets, the upload agent 110 can identify if, and when, an upload session has experienced an interruption. In this regard, an interruption in the upload session can be identified in any of a number of different manners. For example, the upload session can be regarded as interrupted if the total number of received packets, blocks 120 of packet(s) or portion of the upload content 114, which can generally be identified by the upload descriptor 118 and/or one or more information packets, does not equal the total number of received packets, blocks of packet(s) or size of the upload content when the upload session ends or is terminated. Also, the upload session can be regarded as interrupted if the number of erroneously received packets exceeds a predetermined number of packets when the upload session ends or is terminated, where the predetermined number of packets can be dependent on the type of the uploaded content (absolute number or relative) when the upload session ends. In addition, the upload session can be regarded as interrupted if a user of the sender 102 terminates the upload session, or if the upload session is terminated by the sender (e.g. due to power failure).

Presume that an interruption occurs during upload of the content 114, such as during transmission of a third packet. Following the interruption, the recipient 104, or more particularly the upload agent 110, can re-establish communication with the sender 102. In this regard, the interruption can be signaled to the sender. If the interruption is due to power failure or due to any other instance in which the recipient cannot re-establish communication with the sender, however, data that can facilitate recovery of the upload session, such as one or more information packets and/or the upload descriptor 118, can remain in the incomplete download storage 116 such that communication can be re-established at a subsequent time when the recipient is capable of re-establishing communication.

After interruption of the upload session, such as after re-establishing communication with the sender 102, the upload agent 110 can retrieve the upload descriptor 118 and one or more information packets from the incomplete download storage 116. From the upload descriptor and a list of the complete packets stored in the incomplete download storage, which can be determined directly or from the information packet(s), it can be established the packets that need to be uploaded to complete the uploading of the content. In this regard, the upload agent can identify the complete packets stored in the incomplete download storage.

After determining how much of the upload session has been completed, the upload agent 110 can recover the interrupted packet, as well as the remaining packets to be uploaded to the recipient 104 to complete the uploading of the content. In this regard, the upload agent can send an instruction, such as a resume upload message, to the sender 102. In this regard, the instruction can specify a session identifier identifying a upload session to the sender, an object identifier identifying the upload content, and/or a pointer to the interrupted packet. The instruction can also include an identifier identifying the recipient, and/or a description of a cause for the interruption.

Upon receipt of the instruction from the recipient 104, or more particularly the upload agent 110, the sender can send the interrupted packet, as well as the remaining packets of the upload content 114, to the upload agent. As before, upon receipt of the packets, the upload agent can store the packets in the incomplete download storage 116. Then, after the upload agent has received all of the packets of the upload content, the upload agent can, but need not, send a message (e.g., 200 OK message) to the sender to indicate that the upload has been successfully completed. The upload agent can also transfer the upload content from the incomplete download storage to the content storage 112.

Reference is now made to the control flow diagram of FIG. 11, which illustrates a method of upload recovery in accordance with another embodiment. Like the embodiment of FIG. 9, the embodiment of FIG. 11 generally includes the sender 102 establishing communication with the recipient 104, such as in the same manner described above with respect to FIG. 9. After establishing communication with the recipient, in contrast to the embodiment of FIG. 9, the sender does not send an upload descriptor 118 to the recipient. Instead, after establishing communication with the recipient, the sender can begin uploading content 114 to the recipient 104, or more particularly to the upload agent. For example, the sender can upload content to the recipient in accordance with an HTTP POST or HTTP PUT technique, where messages in accordance with each include a header identifying the URI of a location within content storage 112. Again, presume that an interruption occurs during upload of the content 114. Following the interruption, the sender 102 can re-establish communication with the recipient 104, or more particularly the upload agent 110. In this regard, the interruption can be signaled to the recipient.

After re-establishing communication with the recipient 104, then, the sender 102 can request the bit-length or size of the portion of the upload content 114 received by the upload agent 110. For example, the sender can request, and thereafter receive, the size of the portion of the upload content in accordance with the HTTP HEAD technique. As will be appreciated by those skilled in the art, the HTTP HEAD technique is similar to the HTTP GET technique for downloading content, except that the HTTP HEAD technique specifies that a response to a request for content only include header information, as opposed to header information along with the requested content. And as will also be appreciated by those skilled in the art, HTTP header information can include a "content-length" header that specifies the size of the requested content. Thus, to request, and thereafter receive, the size of the portion of the upload content received by the upload agent, the sender can send an HTTP HEAD request to the recipient, where the request includes the URI of the location within content storage 112 including the received portion of the upload content. Upon receiving the request, the recipient (e.g., upload agent) can return a response, such as a 200 OK message, that includes header information (e.g., content-length) specifying the size of the received portion of the upload content.

Upon receiving the length of the received portion of the upload content, the sender can continue uploading the content to the recipient 104 to complete the uploading session. In this regard, as before, the sender can continue to upload content to the recipient in accordance with an HTTP POST/PUT technique. More particularly, to permit the sender to upload, and the upload agent 110 to receive and store only the remaining portion of the content, the sender can continue to upload content to the recipient in accordance with a partial HTTP POST/PUT technique. For example, in uploading the remaining portion of the content, the sender can include header information specifying only the remaining portion of the content, such as a "range" header specifying a bit range of the remaining portion of the content (i.e., the size of the remaining portion of the content). In this regard, whereas such a range header may otherwise instruct the upload agent to perform an overwrite operation on that portion of the upload content stored in content storage 116 and within the specified range, the specified range can comprise a range just beyond the portion of the upload content stored in content storage of the recipient. For example, presume that the size of the portion of the stored in content storage of the recipient is "X." In such an instance, the range header can specify a range of "X+1" through the last bit of the upload content.

As before, the sender 102 can continue to upload the content to the recipient 104 until the upload session has concluded. And as the upload agent 110 receives the remaining portion of the upload content, the upload agent can store the remaining portion with the previous portion in content storage 116. Also as before, after the upload agent has received all of the upload content, the upload agent can, but need not, send a message (e.g., 200 OK message) to the sender to indicate that the upload has been successfully completed.

According to one aspect of the present invention, all or a portion of the system of the present invention, such all or portions of the sender 102 (e.g., terminal 10) and/or recipient 104 (e.g., origin server 22, user processor 31, digital broadcast receiver 36, digital broadcaster 32, etc.), generally operates under control of a computer program product (e.g., content manager 106, upload agent 110, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 7, 9 and 11 are control flow diagrams of methods, systems and program products according to the invention. It will be understood that each block or step of the control flow diagrams, and combinations of blocks in the control flow diagrams, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the control flow diagrams. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that each block or step of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
at least one processor; and
at least one memory including computer program code for one or more programs,
the at least one memory and the computer program code configured to, with the at least one processor, cause the apparatus to perform at least the following,
determine to transmit an upload request for content from an apparatus via a network to a recipient, wherein the content comprises a plurality of data packets;
receive from the recipient in response to the upload request, an upload schedule relating to at least one of a time and a manner of uploading the content in an upload session;
determine to upload the content to the recipient in accordance with the upload schedule;

after an interruption occurs in the upload session, receive a list of completely uploaded data packet identifiers each of which uniquely identifies one corresponding data packet within the upload session; and
reestablish the upload session to upload to the recipient each of the remaining packets that are not completely uploaded.

2. An apparatus according to claim 1, wherein the apparatus is further caused to:
delete the content from the memory after uploading the content to the recipient.

3. An apparatus according to claim 1, wherein the upload schedule includes at least one instruction dependent upon a state of at least one of the recipient or the apparatus, and wherein the apparatus is further caused to:
receive information reflecting a current state of at least one of the recipient or the apparatus before uploading the content, wherein the apparatus uploads the content based upon the at least one instruction dependent upon the state, and the information reflecting the current state of at least one of the recipient or the apparatus.

4. An apparatus according to claim 3, wherein the apparatus is further caused to receive information including at least one of a connectivity, location, actual movement or predicted movement of at least one of the recipient or the apparatus.

5. An apparatus according to claim 1, wherein the upload schedule includes at least one instruction dependent upon a state of at least one network over which the content is uploaded, and wherein the apparatus is further caused to:
receive information reflecting a current state of the at least one network before uploading the content, wherein the content is uploaded based upon the at least one instruction dependent upon the state, and the information reflecting the current state, of the at least one network.

6. An apparatus according to claim 5, wherein the information includes at least one of traffic on the at least one network or bandwidth available to at least one of the recipient or the apparatus on the at least one network.

7. An apparatus according to claim 1, wherein the upload schedule includes at least one instruction defining processing the content, and wherein the apparatus is further caused to: process the content, and upload the processed content.

8. An apparatus according to claim 7, wherein the apparatus processes the content by at least one of transcoding or truncating at least a portion of the content.

9. An apparatus according to claim 7, wherein the apparatus processes the content by breaking up the upload content into a plurality of portions.

10. An apparatus according to claim 1, wherein the upload schedule includes at least one instruction defining at least one deadline for uploading the content, and wherein the content is uploaded based upon the at least one deadline.

11. An apparatus according to claim 1, wherein the content includes a plurality of pieces, wherein the upload schedule includes at least one instruction comprising an ordering of the plurality of pieces of the content, and wherein at least a portion of the content is uploaded based upon the ordering of the plurality of pieces of the content.

12. An apparatus according to claim 1, wherein the upload schedule includes at least one instruction based upon the content and at least one network over which the content is uploaded, and wherein the content is uploaded based upon the content and the at least one network.

13. An apparatus according to claim 1, wherein the upload schedule includes at least one instruction based upon at least one upload time of the content determined based upon the content and at least one network over which the content is uploaded, and wherein the content is uploaded based upon the at least one upload time.

14. An apparatus according to claim 1, the apparatus is further caused to:
receive a trigger to send an upload request, wherein the upload request is sent in response to the trigger independent of interaction from a user of the apparatus.

15. An apparatus according to claim 1, wherein the upload request is sent with an upload descriptor that enables at least one of the apparatus or the recipient to determine if an interruption occurs in uploading the plurality of data packets such that the recipient receives less than the plurality of data packets of the content, and if an interruption occurs in uploading the plurality of data packets, enables the recipient to recover the content.

16. An apparatus according to claim 1, wherein the apparatus is further caused to delete the uploaded content from a storage of the sender without interaction with a user of the sender, after completing the upload session.

17. An apparatus according to claim 1, wherein uploading the content comprises uploading the plurality of data packets and at least one information packet regarding at least one group of at least one data packet.

18. An apparatus according to claim 17, wherein the apparatus is further caused to upload the at least one information packet that enables the recipient to monitor the uploaded data packets to determine, based upon at least one information packet, the at least one information packet including information of a number of data packets to be received between the at least one information packet and an information packet immediately before or after the at least one information packet, if an interruption occurs in uploading the plurality of data packets such that the recipient receives less than the plurality of data packets of the content, and if an interruption occurs in uploading the plurality of data packets, to thereby enable the recipient to recover the content such that the recipient receives the plurality of data packets.

19. An apparatus according to claim 1, wherein the apparatus is further caused to:
determine if an interruption occurs in uploading the content such that the recipient only receives a portion of the content; and
if an interruption occurs in uploading the content, receive a length of the received portion of the content, and thereafter upload a remaining portion of the content to the recipient.

20. An apparatus according to claim 19, wherein the remaining portion of the content is uploaded based upon one or more bit ranges corresponding to a list of one or more packet identifiers of the remaining one or more packets.

21. An apparatus according to claim 19, wherein the length of the received portion of the content is received in accordance with a hypertext transfer protocol (HTTP) HEAD technique, and the remaining portion of the content is uploaded in accordance with one of a HTTP POST or a HTTP PUT technique, wherein the one of the HTTP POST or HTTP PUT technique includes uploading the remaining portion of the content including header information comprising one or more bit ranges corresponding to a list of one or more packet identifiers of the remaining one or more packets.

22. An apparatus according to claim 1, wherein the apparatus is further caused to send a hypertext transfer protocol (HTTP) HEAD request to the recipient, and the remaining packets are uploaded in accordance with one of a HTTP POST or a HTTP PUT technique, wherein the one of the HTTP POST or HTTP PUT technique includes uploading the remaining packets including header information comprising a list of one or more packet identifiers of the remaining one or more packets.

23. An apparatus comprising:
at least one processor; and
at least one memory including computer program code for one or more programs,
the at least one memory and the computer program code configured to, with the at least one processor, cause the apparatus to perform at least the following,
receive an upload request for content from a sender via a network, wherein the content comprises a plurality of data packets
determine, in response to the request, an upload schedule relating to at least one of a time and a manner of the sender uploading the content to the apparatus in an upload session;
receive the content from the sender in accordance with the upload schedule;
track during the upload session received data packets and assembling a list of completely uploaded data packet identifiers each of which uniquely identifies one corresponding data packet within the upload session; and
after an interruption occurs in the upload session, determine to transmit the list of completely uploaded data packet identifiers to the sender for transmitting to the apparatus each of the remaining packets that are not completely uploaded.

24. An apparatus according to claim 23, wherein the upload schedule includes at least one instruction dependent upon a state of at least one of the apparatus or the sender, and wherein the content is received based upon the at least one instruction dependent upon the state of at least one of the apparatus or the sender, and information reflecting a current state of at least one of the apparatus or the sender, the sender having received the information reflecting the current state before uploading the content to the apparatus.

25. An apparatus according to claim 23, wherein the upload schedule includes at least one instruction dependent upon a state of at least one network over which the content is uploaded, and the content is received based upon the at least one instruction dependent upon the state of the at least one network, and information reflecting a current state of the at least one network, the sender having received the information reflecting the current state before uploading the content to the apparatus.

26. An apparatus according to claim 23, wherein the upload schedule includes at least one instruction defining processing the content to thereby direct the sender to process the content, and the processed content is received.

27. An apparatus according to claim 23, wherein the upload schedule includes at least one instruction defining at least one deadline for uploading the content, and the content is received based upon the at least one deadline.

28. An apparatus according to claim 23, wherein the content includes a plurality of pieces, and wherein determining an upload schedule comprises the upload schedule including an ordering of the plurality of pieces of the content, and at least a portion of the content is received based upon the ordering of the plurality of pieces of the content.

29. An apparatus according to claim 23, wherein the upload schedule includes at least one instruction based upon the content and at least one network over which the content is uploaded, and the content is received based upon the content and the at least one network.

30. An apparatus according to claim 23, wherein the upload schedule includes at least one instruction based upon at least one upload time of the content, and the content is received based upon the at least one upload time, the at least one upload time of the content being determined based upon the content and at least one network over which the content is uploaded.

31. An apparatus according to claim 23, wherein the apparatus is further caused to:
receive an upload descriptor and thereafter receiving the plurality of data packets;
determine if an interruption occurs in uploading the plurality of data packets such that the apparatus receives less than the plurality of data packets of the content; and
if an interruption occurs in uploading the plurality of data packets, recover the content based upon the upload descriptor.

32. An apparatus according to claim 31, wherein recovering the content comprises:
determining at least one remaining data packet to be uploaded to the apparatus to thereby complete uploading of the plurality of data packets of the content;
instructing the sender to send the at least one remaining data packet; and
receiving the at least one remaining data packet such that the apparatus receives the plurality of data packets.

33. An apparatus according to claim 31, wherein the apparatus is further caused to push the upload schedule to the sender thereby automatically uploading the content in accordance with the upload schedule, the upload descriptor includes information of a preferred time, place and technology for uploading the content, and the upload session is interrupted by user intervention.

34. An apparatus according to claim 23, wherein the apparatus is further caused to:
monitor the uploaded data packets to determine, based upon at least one information packet, if an interruption occurs in uploading the plurality of data packets such that the apparatus receives less than the plurality of data packets of the content; and
if an interruption occurs in uploading the plurality of data packets, recover the content such that the apparatus receives the plurality of data packets.

35. An apparatus according to claim 23, wherein the apparatus is further caused to:
determine an interruption occurs in uploading the content when the apparatus only receives a portion of the content;
if an interruption occurs in uploading the content, send to the sender a length of the received portion of the content to thereby enable the sender to thereafter upload a remaining portion of the content; and
receive a remaining portion of the content to thereby recover the content such that the apparatus receives all of the content.

36. A method comprising:
receiving an upload request for content from a sender via a network at an apparatus, wherein the content comprises a plurality of data packets;
determining, in response to the request, an upload schedule relating to at least one of a time and a manner of the sender uploading the content to the apparatus in an upload session;
receiving the content from the sender at the apparatus in accordance with the upload schedule;
tracking at the apparatus during the upload session received data packets and assembling a list of completely uploaded data packet identifiers each of which uniquely identifies one corresponding data packet within the upload session; and after an interruption occurs in the upload session, determining to transmit the list of completely uploaded data packet identifiers from the apparatus to the sender for transmitting to the apparatus each of the remaining packets that are not completely uploaded.

37. A method according to claim 36, wherein the upload schedule includes at least one instruction dependent upon a state of at least one of the apparatus or the sender, and wherein the content is received based upon the state of at least one of the apparatus or the sender, and information reflecting a current state of at least one of the apparatus or the sender, the sender having received the information reflecting the current state before uploading the content to the apparatus.

38. A method according to claim 37, wherein the state of at least one of the apparatus or the sender comprises at least one of a connectivity, location, actual movement or predicted movement of at least one of the apparatus or the sender.

39. A method according to claim 36, wherein the upload schedule includes at least one instruction dependent upon a state of at least one network over which the content is uploaded, and wherein the content is received based upon the state of the at least one network, and information reflecting a current state of the at least one network, the sender having received the information reflecting the current state before uploading the content to the apparatus.

40. A method according to claim 39, wherein the state of the at least one network comprises at least one of traffic on the at least one network or bandwidth available to at least one of the apparatus or the sender on the at least one network.

41. A method according to claim 36, wherein the upload schedule includes at least one instruction defining processing the content, and wherein receiving the content comprises receiving the processed content.

42. A method according to claim 41, wherein the upload schedule includes at least one instruction defining at least one of transcoding or truncating at least a portion of the content, and wherein receiving the content comprises receiving the at least one of the transcoded or truncated portion of the content.

43. A method according to claim 41, wherein the upload schedule includes at least one instruction defining breaking up the upload content into a plurality of portions, and wherein receiving the content comprises receiving the portions of the upload content.

44. A method according to claim 36, wherein the upload schedule includes at least one instruction defining at least one deadline for uploading the content, and wherein the content is received based upon the at least one deadline.

45. A method according to claim 36, wherein the content includes a plurality of pieces, wherein the upload schedule includes at least one instruction comprising an ordering of the plurality of pieces of the content, and wherein receiving the content comprises receiving at least a portion of the content based upon the ordering of the plurality of pieces of the content.

46. A method according to claim 36, wherein the upload schedule includes at least one instruction dependent based upon the content and at least one network over which the content is uploaded, and wherein the content is received based upon the content and the at least one network.

47. A method according to claim 36, wherein the upload schedule includes at least one instruction dependent based upon at least one upload time of the content determined based upon the content and at least one network over which the content is uploaded, and wherein the content is received based upon the at least one upload time.

48. A method according to claim 36, further comprising:
sending a trigger to the sender to send an upload request before receiving the upload request, wherein an upload request is received in response to the trigger independent of interaction from a user of the sender.

49. A method according to claim 36, further comprising:
determining an interruption occurs in uploading the plurality of data packets when the apparatus receives less than the plurality of data packets of the content; and
if an interruption occurs in uploading the plurality of data packets, recovering the content based upon the list such that the apparatus receives the plurality of data packets.

50. A method according to claim 49, wherein recovering the content comprises:
determining at least one remaining data packet to be received at the apparatus to thereby complete uploading of the plurality of data packets of the content;
instructing the sender to send the at least one remaining data packet; and
receiving the at least one remaining data packet such that the apparatus receives all of the content.

51. A method according to claim 36, further comprising:
monitoring the received data packets to determine, based upon at least one information packet, the at least one information packet including information of a number of data packets to be received between the at least one information packet and an information packet immediately before or after the at least one information packet, if an interruption occurs in uploading the plurality of data packets such that the apparatus receives less than the plurality of data packets of the content; and
if an interruption occurs in uploading the plurality of data packets, recovering the content such that the apparatus receives the plurality of data packets.

52. A method according to claim 36, further comprising:
determining an interruption occurs in uploading the content when the apparatus only receives a portion of the content;
if an interruption occurs in uploading the content, sending a length of the received portion of the content to the sender; and
receiving a remaining portion of the content to thereby recover the content such that the apparatus receives all of the content.

53. A method according to claim 52, wherein receiving a remaining portion of the content comprises receiving a remaining portion of the content based upon one or more bit ranges corresponding to a list of one or more packet identifiers of the remaining one or more packets.

54. A method according to claim 52, wherein sending a length of the received portion of the content comprises sending a length of the received portion of the content in accordance with a hypertext transfer protocol (HTTP) HEAD technique, and the remaining portion of the content is received in accordance with one of a HTTP POST or a HTTP PUT technique, wherein the one of the HTTP POST or HTTP PUT technique includes receiving the remaining portion of the content including header information that includes one or more bit ranges corresponding to a list of one or more packet identifiers of the remaining one or more packets.

55. A method according to claim 54, wherein the at least one information packet further includes information uniquely describing the data packets before or after the information packet.

56. A method according to claim 55, wherein information uniquely describing the data packets includes a sequence of packet cyclic redundancy checks.

57. A method according to claim 54, wherein the number of data packets to be received between two information packets varies.

58. A method according to claim 36, further comprising receiving a hypertext transfer protocol (HTTP) HEAD request from the sender at the apparatus, wherein receiving a remaining portion of the content comprises receiving the remaining packets in accordance with one of a HTTP POST or a HTTP PUT technique, wherein the one of the HTTP POST or HTTP PUT technique includes receiving the remaining packets including header information comprising a list of one or more packet identifiers of the remaining one or more packets.

59. A method according to claim 36, further comprising:
receiving an upload descriptor of the content from the sender via the network at the apparatus in accordance with the upload schedule, the upload descriptor including a size of the content; and
reestablishing by the apparatus the upload session further based upon the upload descriptor.

60. A method according to claim 59, further comprising:
pushing the upload schedule to the sender thereby automatically uploading the content in accordance with the upload schedule, wherein the upload descriptor includes information of a preferred time, place and technology for uploading the content, and the upload session is interrupted by user intervention.

61. A method according to claim 59, further comprising:
determining an interruption occurs in uploading the plurality of data packets when the apparatus receives less than the plurality of data packets of the content; and
if an interruption occurs in uploading the plurality of data packets, recovering the content based upon the upload descriptor such that the apparatus receives the plurality of data packets.

62. A method according to claim 36, wherein the network includes a cellular network.

63. A computer program product for uploading content, the computer program product comprising at least one non-transitory computer-readable storage medium having computer-readable program code portions stored therein that in response to execution by a processor, cause an apparatus to at least perform the following:
receiving an upload request for content from a sender via a network, wherein the content comprises a plurality of data packets;
determining, in response to the request, an upload schedule relating to at least one of a time and a manner of the sender uploading the content to the apparatus in an upload session;
receiving the content from the sender in accordance with the upload schedule;
tracking during the upload session received data packets and assembling a list of completely uploaded data packet identifiers each of which uniquely identifies one corresponding data packet within the upload session; and
after an interruption occurs in the upload session, determining to transmit the list of completely uploaded data packet identifiers to the sender for transmitting to the apparatus each of the remaining packets that are not completely uploaded.

64. A computer program product according to claim 63, wherein the upload schedule includes at least one instruction defining processing the content to thereby direct the sender to process the content, and the processed content is received.

65. A computer program product according to claim 64, wherein the upload schedule includes at least one instruction defining at least one of transcoding or truncating at least a portion of the content, and wherein receiving the content comprises receiving the at least one of the transcoded or truncated portion of the content.

66. A computer program product according to claim 64, wherein the upload schedule includes at least one instruction defining breaking up the upload content into a plurality of portions, and wherein receiving the content comprises receiving the portions of the upload content.

67. A computer program product according to claim 63, wherein the upload schedule includes at least one instruction defining at least one deadline for uploading the content, and the content is received based upon the at least one deadline.

68. A computer program product according to claim 63, wherein the content including a plurality of pieces, and wherein determining an upload schedule comprises the upload schedule includes an ordering of the plurality of pieces of the content, and at least a portion of the content is received based upon the ordering of the plurality of pieces of the content.

69. A computer program product according to claim 63, wherein the upload schedule includes at least one instruction based upon the content and at least one network over which the content is uploaded, and the content is received based upon the content and the at least one network.

70. A computer program product according to claim 63, wherein the upload schedule includes at least one instruction based upon at least one upload time of the content determined based upon the content and at least one network over which the content is uploaded, and the content is received based upon the at least one upload time.

71. A computer program product according to claim 63, wherein the apparatus is caused to further perform:
sending a trigger to the sender to send an upload request before receiving the upload request, wherein an upload request is received in response to the trigger independent of interaction from a user of the sender.

72. A computer program product according to claim 63, wherein the apparatus is caused to further perform:
receiving an upload descriptor and thereafter receiving the content, determining if an interruption occurs in uploading the plurality of data packets such that the apparatus receives less than the plurality of data packets of the content; and
if an interruption occurs in uploading the plurality of data packets, recovering the content based upon the upload descriptor.

73. A computer program product according to claim 72, wherein recovering the content comprises:
determining at least one remaining data packet to be received at the apparatus to thereby complete uploading of the plurality of data packets of the content;
instructing the sender to send the at least one remaining data packet; and
receiving the at least one remaining data packet such that the apparatus receives all of the content.

74. A computer program product according to claim 72, wherein the apparatus is caused to further perform: pushing the upload schedule to the sender thereby automatically uploading the content in accordance with the upload schedule, wherein the upload descriptor includes information of a preferred time, place and technology for uploading the content, and the upload session is interrupted by user intervention.

75. A computer program product according to claim 74, wherein the apparatus is caused to further perform:
  monitoring the received data packets to determine, based upon at least one information packet, the at least one information packet including information of a number of data packets to be received between the at least one information packet and an information packet immediately before or after the at least one information packet, if an interruption occurs in uploading the plurality of data packets such that the apparatus receives less than the plurality of data packets of the content; and
  if an interruption occurs in uploading the plurality of data packets, recovering the content such that the apparatus receives the plurality of data packets.

76. A computer program product according to claim 63, wherein the apparatus is caused to further perform:
  determining an interruption occurs in uploading the content when the apparatus only receives a portion of the content;
  if an interruption occurs in uploading the content, sending a length of the received portion of the content to the sender; and
  receiving a remaining portion of the content to thereby recover the content.

77. A computer program product according to claim 76, wherein the remaining portion of the content is received based upon one or more bit ranges corresponding to a list of one or more packet identifiers of the remaining one or more packets.

78. A computer program product according to claim 76, wherein sending a length of the received portion of the content comprises sending a length of the received portion of the content in accordance with a hypertext transfer protocol (HTTP) HEAD technique, and the remaining portion of the content is received in accordance with one of a HTTP POST or a HTTP PUT technique, wherein the one of the HTTP POST or HTTP PUT technique includes receiving the remaining portion of the content including header information that includes one or more bit ranges corresponding to a list of one or more packet identifiers of the remaining one or more packets.

79. A computer program product according to claim 78, further comprising receiving a hypertext transfer protocol (HTTP) HEAD request from the sender at the apparatus, wherein receiving a remaining portion of the content comprises receiving the remaining packets in accordance with one of a HTTP POST or a HTTP PUT technique, wherein the one of the HTTP POST or HTTP PUT technique includes receiving the remaining packets including header information comprising a list of one or more packet identifiers of the remaining one or more packets.

80. A method comprising:
  determining to transmit an upload request for content from an apparatus via a network to a recipient, wherein the content comprises a plurality of data packets;
  receiving from the recipient at the apparatus, in response to the upload request, an upload schedule relating to at least one of a time and a manner of uploading the content in an upload session;
  determining by the apparatus to upload the content to the recipient in accordance with the upload schedule;
  after an interruption occurs in the upload session, receiving at the apparatus a list of completely uploaded data packet identifiers each of which uniquely identifies one corresponding data packet within the upload session; and
  reestablishing by the apparatus the upload session to upload to the recipient each of the remaining packets that are not completely uploaded.

81. A method according to claim 80, further comprising deleting the content from the memory after uploading the content to the recipient.

82. A method according to claim 80, wherein the upload schedule includes at least one instruction dependent upon a state of at least one of the recipient or the apparatus, and wherein the method further comprises receiving information reflecting a current state of at least one of the recipient or the apparatus before uploading the content to thereby enable the apparatus to upload the content based upon the at least one instruction dependent upon the state, and the information reflecting the current state, of at least one of the recipient or the apparatus.

83. A method according to claim 82, further comprising receiving information reflecting a current state comprising at least one of a connectivity, location, actual movement or predicted movement of at least one of the recipient or the apparatus.

84. A method according to claim 80, wherein the upload schedule includes at least one instruction dependent upon a state of at least one network over which the content is uploaded, and wherein the method further comprises receiving information reflecting a current state of the at least one network before uploading the content to thereby enable the apparatus to upload the content based upon the at least one instruction dependent upon the state, and the information reflecting the current state, of the at least one network.

85. A method according to claim 84, further comprising receiving information comprising at least one of traffic on the at least one network or bandwidth available to at least one of the recipient or the apparatus on the at least one network.

86. A method according to claim 80, wherein the upload schedule includes at least one instruction defining processing the content, and wherein the method further comprises processing the content thereby uploading the processed content.

87. A method according to claim 86, further comprising at least one of transcoding and truncating at least a portion of the content thereby uploading the at least one of the transcoded or truncated portion of the content.

88. A method according to claim 86, further comprising breaking up the upload content into a plurality of portions to thereby upload the portions of the upload content.

89. A method according to claim 80, wherein the upload schedule includes at least one instruction defining at least one deadline for uploading the content, and wherein the method further comprises uploading the content based upon the at least one deadline.

90. A method according to claim 80, wherein the content includes a plurality of pieces, wherein the upload schedule includes at least one instruction comprising an ordering of the plurality of pieces of the content, and wherein the method further comprises uploading at least a portion of the content based upon the ordering of the plurality of pieces of the content.

91. A method according to claim 80, wherein the upload schedule includes at least one instruction based upon the content and at least one network over which the content is uploaded, and wherein the method further comprises uploading the content based upon the content and the at least one network.

92. A method according to claim 80, wherein the upload schedule includes at least one instruction based upon at least one upload time of the content determined based upon the content and at least one network over which the content is uploaded, and wherein the method further comprises uploading the content based upon the at least one upload time.

93. A method according to claim 80, further comprising receiving a trigger to send an upload request before sending the upload request, and sending the upload request in response to the trigger independent of interaction from a user of the sender.

94. A method according to claim 80, further comprising
sending an upload descriptor and thereafter uploading the content,
determining if an interruption occurs in uploading the plurality of data packets such that the recipient receives less than the plurality of data packets of the content, and
if an interruption occurs in uploading the plurality of data packets, enabling the recipient to recover the content based upon the upload descriptor such that the recipient receives the plurality of data packets.

95. A method according to claim 94, further comprising deleting the uploaded content from a storage of the sender without interaction with a user of the sender, after completing the upload session.

96. A method according to claim 80, wherein the content comprises a plurality of data packets, and wherein the method further comprises uploading the plurality of data packets and at least one information packet regarding at least one group of at least one data packet.

97. A method according to claim 96, further comprising:
uploading the at least one information packet that enables the recipient to monitor the uploaded data packets to determine, based upon at least one information packet, the at least one information packet including information of a number of data packets to be received between the at least one information packet and an information packet immediately before or after the at least one information packet, if an interruption occurs in uploading the plurality of data packets such that the recipient receives less than the plurality of data packets of the content, and
if an interruption occurs in uploading the plurality of data packets, recovering the content such that the recipient receives the plurality of data packets.

98. A method according to claim 80, further comprising:
determining if an interruption occurs in uploading the content such that the recipient only receives a portion of the content, and
if an interruption occurs in uploading the content, receiving a length of the received portion of the content to thereby upload a remaining portion of the content to the recipient.

99. A method according to claim 98, further comprising uploading a remaining portion of the content based upon one or more bit ranges corresponding to a list of one or more packet identifiers of the remaining one or more packets.

100. A method according to claim 98, further comprising receiving a length of the received portion of the content in accordance with a hypertext transfer protocol (HTTP) HEAD technique; and uploading the remaining portion of the content in accordance with one of a HTTP POST or a HTTP PUT technique, wherein the one of the HTTP POST or HTTP PUT technique includes uploading the remaining portion of the content including header information comprising one or more bit ranges corresponding to a list of one or more packet identifiers of the remaining one or more packets.

101. A method according to claim 100, further comprising:
sending a hypertext transfer protocol (HTTP) HEAD request to the recipient; and uploading the remaining packets in accordance with one of a HTTP POST or a HTTP PUT technique, wherein the one of the HTTP POST or HTTP PUT technique includes uploading the remaining packets including header information comprising a list of one or more packet identifiers of the remaining one or more packets.

102. A method according to claim 80, further comprising:
after the interruption, receiving at the apparatus an instruction to reestablish the upload session, the instruction including an identifier of the content and an identifier of the one interrupted packet.

\* \* \* \* \*